US012739460B2

(12) United States Patent
Loheide et al.

(10) Patent No.: US 12,739,460 B2
(45) Date of Patent: Sep. 15, 2026

(54) PUBLISHING DISPARATE LIVE MEDIA OUTPUT STREAMS IN MIXED MODE

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 34 days.

(21) Appl. No.: 19/030,248

(22) Filed: Jan. 17, 2025

(65) Prior Publication Data

US 2025/0240473 A1 Jul. 24, 2025

Related U.S. Application Data

(63) Continuation of application No. 18/323,582, filed on May 25, 2023, which is a continuation of application (Continued)

(51) Int. Cl.
*H04N 21/262* (2011.01)
*H04N 21/2187* (2011.01)
(Continued)

(52) U.S. Cl.
CPC ..... *H04N 21/2625* (2013.01); *H04N 21/2187* (2013.01); *H04N 21/26258* (2013.01); (Continued)

(58) Field of Classification Search
CPC ........... H04N 21/2625; H04N 21/2187; H04N 21/26258; H04N 21/2668; H04N 21/4532; H04N 21/4583; H04N 21/8456
See application file for complete search history.

(56) References Cited

U.S. PATENT DOCUMENTS 3,751,581 A 8/1973 Sakata et al.
4,500,930 A 2/1985 Hamalainen et al.
(Continued)

FOREIGN PATENT DOCUMENTS

AU 2015202846 A1 1/2016
KR 10-1061952 B1 9/2011
WO 2014/019063 A1 2/2014

OTHER PUBLICATIONS

Final Office Action for U.S. Appl. No. 15/988,572 dated May 12, 2021.

(Continued)

*Primary Examiner* — Chenea Davis
(74) *Attorney, Agent, or Firm* — Alston & Bird LLP

(57) ABSTRACT

A system generates a disparate live media output stream manifest based on a programming schedule, an additional parameter, and one of a first live input stream manifest or a first pre-encoded media asset manifest. Based on a first transition or a second transition, a different pre-encoded media asset manifest or a different live input stream manifest is inserted to the disparate live media output stream manifest. A first live input stream or a first pre-encoded media asset is switched to a different pre-encoded media asset, or a different live input stream based on the insertion. The first live input stream manifest or the first pre-encoded media asset manifest is modified based on the switching of the first live input stream or the first pre-encoded media asset to the different pre-encoded media asset or the different live input stream.

20 Claims, 9 Drawing Sheets

Related U.S. Application Data

No. 17/340,538, filed on Jun. 7, 2021, now Pat. No. 11,671,641, which is a continuation of application No. 16/229,614, filed on Dec. 21, 2018, now Pat. No. 11,109,086, which is a continuation-in-part of application No. 15/396,475, filed on Dec. 31, 2016, now Pat. No. 11,134,309.

(60) Provisional application No. 62/699,131, filed on Jul. 17, 2018.

(51) Int. Cl.
*H04N 21/2668* (2011.01)
*H04N 21/45* (2011.01)
*H04N 21/458* (2011.01)
*H04N 21/845* (2011.01)

(52) U.S. Cl.
CPC ..... *H04N 21/2668* (2013.01); *H04N 21/4532* (2013.01); *H04N 21/4583* (2013.01); *H04N 21/8456* (2013.01)

(56) References Cited

U.S. PATENT DOCUMENTS 5,294,981 A 3/1994 Yazolino et al.
6,229,524 B1 5/2001 Chernock et al.
6,378,129 B1 4/2002 Zetts
6,434,621 B1 8/2002 Pezzillo et al.
6,625,811 B1 9/2003 Kaneko
6,701,355 B1 3/2004 Brandt et al.
6,727,914 B1 4/2004 Gutta
7,051,352 B1 5/2006 Schaffer
7,337,458 B2 2/2008 Michelitsch et al.
7,380,262 B2 5/2008 Wang et al.
7,581,237 B1 8/2009 Kurapati
7,610,597 B1 10/2009 Johnson et al.
7,840,980 B2 11/2010 Gutta
7,985,134 B2 7/2011 Ellis
8,005,826 B1 8/2011 Sahami et al.
8,099,757 B2 1/2012 Riedl et al.
8,132,203 B2 3/2012 De Heer
8,234,350 B1 7/2012 Gu et al.
8,455,803 B2 6/2013 Danzer et al.
8,458,053 B1 6/2013 Buron et al.
8,533,761 B1 9/2013 Sahami et al.
8,553,853 B2 10/2013 Middleswarth et al.
8,572,649 B1 10/2013 Gossweiler et al.
8,578,042 B2 11/2013 Hu et al.
8,600,382 B2 12/2013 Hicks, III
8,631,440 B2 1/2014 Gossweiler et al.
8,819,726 B2 8/2014 Wetzer et al.
8,826,443 B1 9/2014 Raman et al.
8,842,879 B2 9/2014 Laksono et al.
8,843,965 B1 9/2014 Kurapati et al.
8,954,521 B1 2/2015 Faaborg et al.
9,094,639 B2 7/2015 Yim et al.
9,130,918 B2 9/2015 Picconi et al.
9,342,668 B2 5/2016 Wang et al.
9,380,264 B1 6/2016 Vakalapudi
9,390,447 B1 7/2016 Smith
9,959,349 B1 5/2018 Nijim et al.
10,045,091 B1 8/2018 Nijim et al.
10,075,753 B2 9/2018 Loheide et al.
10,148,716 B1 12/2018 Joseph et al.
10,194,177 B1 1/2019 Ashbacher
10,586,016 B2 3/2020 Dominick et al.
10,771,824 B1 9/2020 Haritaoglu et al.
10,856,016 B2 12/2020 Loheide et al.
10,924,804 B2 2/2021 Loheide et al.
10,965,967 B2 3/2021 Loheide et al.
10,992,973 B2 4/2021 Loheide et al.
11,051,061 B2 6/2021 Loheide et al.
11,051,074 B2 6/2021 Loheide et al.
11,109,086 B2 8/2021 Loheide et al.
11,109,102 B2 8/2021 Loheide et al.
11,134,309 B2 9/2021 Loheide et al.
11,438,658 B2 9/2022 Loheide et al.
11,451,872 B1 9/2022 Spencer et al.
11,470,373 B2 10/2022 Loheide et al.
11,477,254 B2 10/2022 Loheide et al.
11,483,596 B2 10/2022 Loheide et al.
11,503,349 B2 11/2022 Loheide et al.
11,546,400 B2 1/2023 Loheide et al.
11,611,804 B2 3/2023 Loheide et al.
11,622,143 B2 4/2023 Loheide et al.
11,665,398 B2 5/2023 Loheide et al.
11,671,641 B2 6/2023 Loheide et al.
2002/0038457 A1 3/2002 Numata et al.
2002/0112239 A1 8/2002 Goldman
2002/0178447 A1 11/2002 Plotnick et al.
2003/0023757 A1 1/2003 Ishioka et al.
2003/0026628 A1 2/2003 Arimoto
2003/0051239 A1 3/2003 Hudspeth
2003/0110507 A1 6/2003 Dimitrova et al.
2003/0126600 A1 7/2003 Heuvelman
2003/0151538 A1 8/2003 Escobosa et al.
2003/0182658 A1 9/2003 Alexander
2003/0212708 A1 11/2003 Potrebic et al.
2003/0236832 A1 12/2003 Mcintyre et al.
2004/0022278 A1 2/2004 Thomas et al.
2004/0031056 A1 2/2004 Wolff
2004/0128682 A1 7/2004 Liga et al.
2004/0163103 A1 8/2004 Swix et al.
2004/0172650 A1 9/2004 Hawkins et al.
2004/0172662 A1 9/2004 Danker et al.
2005/0015816 A1 1/2005 Christofalo et al.
2005/0060745 A1 3/2005 Riedl et al.
2005/0096978 A1 5/2005 Black
2005/0120369 A1 6/2005 Matz
2005/0132401 A1 6/2005 Boccon-Gibod et al.
2005/0135613 A1 6/2005 Brandenburg et al.
2006/0031889 A1 2/2006 Bennett et al.
2006/0064730 A1 3/2006 Rael et al.
2006/0122916 A1 6/2006 Kassan
2006/0287915 A1 12/2006 Boulet et al.
2007/0011718 A1 1/2007 Nee
2007/0033419 A1 2/2007 Kocher et al.
2007/0101361 A1 5/2007 Spielman et al.
2007/0186228 A1 8/2007 Ramaswamy et al.
2007/0238035 A1 10/2007 Holscher et al.
2007/0250901 A1 10/2007 Mcintire et al.
2008/0086742 A1 4/2008 Aldrey et al.
2008/0163304 A1 7/2008 Ellis
2008/0201735 A1 8/2008 Sumiyoshi et al.
2008/0263578 A1* 10/2008 Bayer .................... G06Q 30/02 725/23
2008/0271078 A1 10/2008 Gossweiler et al.
2008/0271080 A1 10/2008 Gossweiler et al.
2008/0320513 A1 12/2008 Wong et al.
2009/0049469 A1 2/2009 Small et al.
2009/0070808 A1 3/2009 Jacobs
2009/0070819 A1 3/2009 Gajda et al.
2009/0083810 A1 3/2009 Hattori et al.
2009/0100452 A1 4/2009 Hudgeons et al.
2009/0187939 A1 7/2009 Lajoie
2009/0254934 A1 10/2009 Grammens
2009/0256972 A1 10/2009 Ramaswamy et al.
2009/0285217 A1 11/2009 Frink et al.
2009/0287790 A1 11/2009 Upton et al.
2009/0328096 A1 12/2009 Krause et al.
2010/0010899 A1 1/2010 Lambert et al.
2010/0125880 A1 5/2010 Roewe
2010/0146548 A1 6/2010 Yim et al.
2010/0146559 A1 6/2010 Lee et al.
2010/0169914 A1 7/2010 Williamson et al.
2010/0287297 A1 11/2010 Lefebvre
2010/0293585 A1 11/2010 Xia
2010/0325655 A1 12/2010 Perez
2010/0325657 A1 12/2010 Sellers et al.
2011/0022471 A1 1/2011 Brueck et al.
2011/0052144 A1 3/2011 Abbas et al.
2011/0123062 A1 5/2011 Hilu
2011/0153464 A1 6/2011 Hendricks et al.

(56) References Cited

U.S. PATENT DOCUMENTS

2011/0161500 A1 6/2011 Yengalasetti et al.
2011/0164115 A1 7/2011 Bennett et al.
2011/0177775 A1 7/2011 Gupta et al.
2011/0209181 A1 8/2011 Gupta et al.
2011/0238754 A1 9/2011 Dasilva et al.
2011/0246202 A1 10/2011 Mcmillan et al.
2011/0302601 A1 12/2011 Mayo et al.
2011/0321088 A1* 12/2011 Jacobs ................ H04N 21/812 725/35
2012/0017282 A1 1/2012 Kang et al.
2012/0030011 A1 2/2012 Rey et al.
2012/0047542 A1 2/2012 Lewis et al.
2012/0110621 A1 5/2012 Gossweiler, III
2012/0143693 A1 6/2012 Chung et al.
2012/0192232 A1 7/2012 Ellis
2012/0271942 A1 10/2012 Walker et al.
2012/0272264 A1 10/2012 Suzuki et al.
2012/0272278 A1 10/2012 Bedi
2012/0284737 A1 11/2012 Savoor et al.
2012/0304223 A1 11/2012 Sargent et al.
2013/0085851 A1 4/2013 Pedro et al.
2013/0121487 A1 5/2013 Lorberbaum et al.
2013/0160051 A1 6/2013 Armstrong et al.
2013/0198328 A1 8/2013 Green et al.
2013/0205212 A1 8/2013 Sinha et al.
2013/0208811 A1 8/2013 Liu et al.
2013/0227283 A1 8/2013 Williamson et al.
2013/0227284 A1 8/2013 Pfeffer et al.
2013/0263168 A1 10/2013 Choi
2013/0263182 A1 10/2013 Ivy et al.
2013/0276023 A1 10/2013 Kent et al.
2013/0305287 A1 11/2013 Wong et al.
2013/0312041 A1 11/2013 Gabriele
2013/0325605 A1 12/2013 Callaghan et al.
2014/0013354 A1 1/2014 Johnson et al.
2014/0020017 A1 1/2014 Stern et al.
2014/0032259 A1 1/2014 Lafever et al.
2014/0033240 A1 1/2014 Card, II
2014/0071818 A1 3/2014 Wang et al.
2014/0143806 A1 5/2014 Steinberg et al.
2014/0150019 A1 5/2014 Ma et al.
2014/0152894 A1 6/2014 Childs et al.
2014/0157312 A1 6/2014 Williams et al.
2014/0173666 A1 6/2014 Gordon et al.
2014/0186001 A1 7/2014 Aldrey et al.
2014/0189514 A1 7/2014 Hilliard
2014/0189743 A1 7/2014 Kennedy et al.
2014/0189754 A1 7/2014 Major et al.
2014/0230003 A1 8/2014 Ma et al.
2014/0237243 A1 8/2014 Ma et al.
2014/0270338 A1 9/2014 Zhao et al.
2014/0280781 A1 9/2014 Gregotski
2014/0282723 A1 9/2014 Sinha et al.
2014/0310745 A1 10/2014 Canney et al.
2014/0317666 A1 10/2014 Chiarulli et al.
2014/0351843 A1 11/2014 Theriault
2014/0359656 A1 12/2014 Banica et al.
2014/0366068 A1 12/2014 Burkitt et al.
2015/0012926 A1 1/2015 Wei et al.
2015/0033255 A1 1/2015 Neumann et al.
2015/0058874 A1 2/2015 Sun et al.
2015/0074732 A1 3/2015 Green et al.
2015/0106856 A1 4/2015 Rankine
2015/0127845 A1 5/2015 Phillips et al.
2015/0215359 A1 7/2015 Bao et al.
2015/0237386 A1 8/2015 Sheehan et al.
2015/0237389 A1 8/2015 Grouf et al.
2015/0249865 A1 9/2015 Oliveira
2015/0256861 A1 9/2015 Oyman
2015/0271234 A1 9/2015 O'Malley et al.
2015/0289022 A1 10/2015 Gross
2015/0381936 A1 12/2015 Goyal et al.
2015/0382042 A1 12/2015 Wagenaar et al.
2015/0382047 A1 12/2015 Van et al.
2015/0382274 A1 12/2015 Logvinov et al.
2016/0029055 A1 1/2016 Villegas et al.
2016/0063530 A1 3/2016 Lin
2016/0073155 A1 3/2016 Subramaniam et al.
2016/0077710 A1 3/2016 Lewis et al.
2016/0105477 A1 4/2016 Holden et al.
2016/0112740 A1 4/2016 Francisco et al.
2016/0127786 A1 5/2016 Langer
2016/0127788 A1 5/2016 Roberts et al.
2016/0142783 A1 5/2016 Bagga et al.
2016/0150290 A1 5/2016 Chandler et al.
2016/0165306 A1 6/2016 Nam
2016/0182923 A1 6/2016 Higgs et al.
2016/0182954 A1 6/2016 Nguyen et al.
2016/0198202 A1 7/2016 Van et al.
2016/0227260 A1 8/2016 Hundemer et al.
2016/0255391 A1 9/2016 Noble
2016/0308958 A1 10/2016 Navali et al.
2016/0316247 A1 10/2016 Biagini et al.
2016/0337680 A1 11/2016 Kalagi et al.
2016/0337704 A1 11/2016 Binder et al.
2016/0345074 A1 11/2016 Serbest et al.
2016/0366202 A1 12/2016 Phillips et al.
2017/0019453 A1 1/2017 Panje
2017/0041656 A1 2/2017 Bieschke
2017/0055012 A1 2/2017 Phillips et al.
2017/0055041 A1 2/2017 Zhu
2017/0064400 A1 3/2017 Riegel et al.
2017/0070789 A1 3/2017 Liassides et al.
2017/0085935 A1 3/2017 Riedel et al.
2017/0099506 A1 4/2017 Grover
2017/0099511 A1 4/2017 Grover
2017/0099525 A1 4/2017 Ray et al.
2017/0111418 A1 4/2017 Warren et al.
2017/0118537 A1 4/2017 Stransky-Heilkron et al.
2017/0118538 A1 4/2017 Ashbacher
2017/0164019 A1 6/2017 Oh et al.
2017/0171610 A1 6/2017 Nair et al.
2017/0193544 A1 7/2017 Glasgow et al.
2017/0195718 A1 7/2017 Nair et al.
2017/0201779 A1 7/2017 Publicover et al.
2017/0238035 A1 8/2017 Perez
2017/0257446 A1 9/2017 Bevilacqua et al.
2017/0289597 A1 10/2017 Riedel et al.
2017/0295386 A1 10/2017 Owen et al.
2017/0308681 A1 10/2017 Gould et al.
2017/0310752 A1 10/2017 Knothe
2017/0332114 A1 11/2017 Turgut et al.
2018/0007060 A1 1/2018 Leblang et al.
2018/0035136 A1 2/2018 Crowe
2018/0048599 A1 2/2018 Arghandiwal et al.
2018/0131986 A1 5/2018 Cole et al.
2018/0160159 A1 6/2018 Asarikuniyil
2018/0165650 A1 6/2018 Kashyape et al.
2018/0184047 A1 6/2018 Simonsen et al.
2018/0285747 A1 10/2018 Bron et al.
2018/0300751 A1 10/2018 Hammitt et al.
2018/0343505 A1 11/2018 Loheide et al.
2018/0367823 A1 12/2018 Brinkley et al.
2019/0068665 A1 2/2019 Kieft et al.
2019/0075148 A1 3/2019 Nielsen et al.
2019/0364317 A1 11/2019 Milford
2019/0380021 A1 12/2019 Meek et al.
2020/0059308 A1 2/2020 Cox et al.
2020/0244778 A1 7/2020 Berookhim et al.
2021/0297740 A1 9/2021 Loheide et al.
2022/0272411 A1 8/2022 Loheide et al.
2023/0014831 A1 1/2023 Marten
2024/0348879 A1 10/2024 Loheide et al.

OTHER PUBLICATIONS

Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/229,614 dated Jul. 9, 2020.

(56) References Cited

OTHER PUBLICATIONS

Final Office Action for U.S. Appl. No. 16/230,268 dated Apr. 17, 2020.
Final Office Action for U.S. Appl. No. 16/234,870 dated Jul. 9, 2020.
Final Office Action for U.S. Appl. No. 16/236,713 dated Sep. 30, 2020.
Final Office Action for U.S. Appl. No. 16/854,970 dated Aug. 18, 2021.
Final Office Action for U.S. Appl. No. 16/918,085 dated Dec. 8, 2021.
Final Office Action for U.S. Appl. No. 16/918,085 dated Oct. 24, 2022.
Final Office Action for U.S. Appl. No. 17/017,241 dated Apr. 28, 2022.
Final Office Action for U.S. Appl. No. 17/038,323 dated Nov. 1, 2021.
Final Office Action for U.S. Appl. No. 17/206,473 dated Sep. 8, 2022.
Final Office Action for U.S. Appl. No. 17/206,737 dated Jan. 5, 2023.
Final Office Action for U.S. Appl. No. 17/366,738 dated Jul. 20, 2023.
Final Office Action for U.S. Appl. No. 17/408,680 dated Jan. 12, 2023.
Final Office Action for U.S. Appl. No. 17/408,739 dated Jan. 12, 2023.
Final Office Action in U.S. Appl. No. 15/396,468 dated Jan. 26, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Final Rejection Mailed on Dec. 3, 2024 for U.S. Appl. No. 18/323,582, 9 page(s).
Final Rejection Mailed on Dec. 19, 2024 for U.S. Appl. No. 18/508,682, 8 page(s).
Final Rejection Mailed on Jan. 2, 2025 for U.S. Appl. No. 17/394,265, 7 page(s).
Final Rejection Mailed on Jun. 18, 2024 for U.S. Appl. No. 17/875,775, 10 page(s).
Non Final Office Action for U.S. Appl. No. 17/875,775, dated Dec. 7, 2023, (9 pages), United States Patent and Trademark Office, US.
Non-Final Office Action dated Aug. 17, 2023, for U.S. Appl. No. 18/147,421, (7 pages), United States Patent and Trademark Office, US.
Non-Final Office Action for U.S. Appl. No. 15/986,286 dated Nov. 29, 2019.
Non-Final Office Action for U.S. Appl. No. 15/988,472 dated Dec. 27, 2019.
Non-Final Office Action for U.S. Appl. No. 15/988,572 dated Dec. 27, 2019.
Non-Final Office Action for U.S. Appl. No. 15/988,572 dated Nov. 6, 2020.
Non-Final Office Action for U.S. Appl. No. 16/236,713 dated May 29, 2020.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Non-Final Office Action for U.S. Appl. No. 16/918,085 dated Aug. 19, 2021.
Non-Final Office Action for U.S. Appl. No. 17/326,281 dated Aug. 18, 2022.
Non-Final Office Action for U.S. Appl. No. 15/396,468 dated Feb. 4, 2020.
Non-Final Office Action for U.S. Appl. No. 15/396,468 dated Jun. 1, 2021.
Non-Final Office Action for U.S. Appl. No. 15/396,475 dated Aug. 6, 2020.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,406 dated Dec. 18, 2019.
Non-Final Office Action for U.S. Appl. No. 15/986,406 dated Oct. 30, 2020.
Non-Final Office Action for U.S. Appl. No. 15/986,451 dated Apr. 16, 2020.
Non-Final Office Action for U.S. Appl. No. 15/988,308 dated Dec. 3, 2019.
Non-Final Office Action for U.S. Appl. No. 15/988,308 dated Sep. 8, 2020.
Advisory Action (PTOL-303) Mailed on Mar. 21, 2025 for U.S. Appl. No. 18/508,682, 3 page(s).
Advisory Action (PTOL-303) Mailed on Nov. 28, 2022 for U.S. Appl. No. 17/206,473, 3 page(s).
Advisory Action (PTOL-303) Mailed on Oct. 11, 2024 for U.S. Appl. No. 17/875,775, 3 page(s).
Advisory Action (PTOL-303) Mailed on Sep. 30, 2020 for U.S. Appl. No. 16/229,614, 3 page(s).
Advisory Action for U.S. Appl. No. 15/396,475 dated Jun. 3, 2019.
Advisory Action for U.S. Appl. No. 15/988,308 dated Jul. 16, 2019.
Advisory Action for U.S. Appl. No. 15/396,468 dated Jan. 16, 2020.
Advisory Action for U.S. Appl. No. 15/396,475 dated May 13, 2020.
Advisory Action for U.S. Appl. No. 15/396,614 dated Oct. 24, 2019.
Advisory Action for U.S. Appl. No. 15/986,218 dated Jul. 12, 2019.
Advisory Action for U.S. Appl. No. 15/986,361 dated Feb. 26, 2020.
Advisory Action for U.S. Appl. No. 15/986,451 dated Feb. 20, 2020.
Advisory Action for U.S. Appl. No. 17/408,680 dated Mar. 28, 2023.
Advisory Action for U.S. Appl. No. 17/408,739 dated Mar. 28, 2023.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowability for U.S. Appl. No. 16/230,493 dated Jul. 8, 2021.
Corrected Notice of Allowance for U.S. Appl. No. 15/396,368 dated Apr. 1, 2022.
Corrected Notice of Allowance for U.S. Appl. No. 15/396,453 dated Jun. 3, 2019.
Corrected Notice of Allowance for U.S. Appl. No. 16/128,104 dated Jun. 22, 2020.
Corrected Notice of Allowance for U.S. Appl. No. 16/902,775 dated Jul. 30, 2021.
Corrected Notice of Allowance for U.S. Appl. No. 15/396,468 dated Apr. 1, 2022.
Corrected Notice of Allowance for U.S. Appl. No. 15/396,468 dated Aug. 26, 2022.
Corrected Notice of Allowance for U.S. Appl. No. 15/396,468 dated Jun. 24, 2022.
Corrected Notice of Allowance for U.S. Appl. No. 15/396,468 dated Oct. 17, 2022.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/396,624 dated Sep. 5, 2019.

(56) References Cited

OTHER PUBLICATIONS

Corrected Notice of Allowance for U.S. Appl. No. 15/986,286 dated May 27, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 15/988,241 dated May 8, 2020.
Corrected Notice of Allowance for U.S. Appl. No. 15/988,241 dated Nov. 18, 2020.
Corrected Notice of Allowance for U.S. Appl. No. 15/988,308 dated Dec. 22, 2021.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Corrected Notice of Allowance for U.S. Appl. No. 16/128,104 dated Apr. 15, 2020.
Corrected Notice of Allowance for U.S. Appl. No. 16/128,104 dated Jul. 8, 2020.
Corrected Notice of Allowance for U.S. Appl. No. 16/128,104 dated May 20, 2020.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Notice of Allowance in U.S. Appl. No. 16/236,673 mailed May 1, 2020.
Office Action in U.S. Appl. No. 15/396,453 dated Feb. 27, 2018.
Office Action in U.S. Appl. No. 15/396,475 dated Mar. 29, 2018.
Restriction Requirement for U.S. Appl. No. 16/231,467 dated Feb. 5, 2020.
Supplemental Notice of Allowance for U.S. Appl. No. 15/988,492 dated Nov. 9, 2021.
Supplemental Notice of Allowance for U.S. Appl. No. 15/986,218 dated Jan. 27, 2021.
Supplemental Notice of Allowance for U.S. Appl. No. 15/396,624 dated Aug. 14, 2019.
Supplemental Notice of Allowance for U.S. Appl. No. 17/527,817 dated Jan. 5, 2023.
Supplemental Notice of Allowability for U.S. Appl. No. 15/988,492 dated Dec. 14, 2021.
Supplemental Notice of Allowance for U.S. Appl. No. 17/527,817 dated Feb. 28, 2023.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Non-Final Office Action for U.S. Appl. No. 15/988,492 dated Apr. 14, 2021.
Non-Final Office Action for U.S. Appl. No. 15/988,492 dated Feb. 18, 2020.
Non-Final Office Action for U.S. Appl. No. 15/988,492 dated Sep. 10, 2020.
Non-Final Office Action for U.S. Appl. No. 15/988,572 dated Aug. 25, 2021.
Non-Final Office Action for U.S. Appl. No. 15/988,572 dated Oct. 6, 2022.
Non-Final Office Action for U.S. Appl. No. 16/128,104 dated Aug. 21, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/229,614 dated Mar. 19, 2020.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/235,445 dated Apr. 2, 2020.
Non-Final Office Action for U.S. Appl. No. 16/236,673 dated Jan. 10, 2020.
Non-Final Office Action for U.S. Appl. No. 16/854,970 dated Feb. 17, 2022.
Non-Final Office Action for U.S. Appl. No. 16/854,970 dated Mar. 17, 2021.
Non-Final Office Action for U.S. Appl. No. 16/902,775 dated Oct. 5, 2020.
Non-Final Office Action for U.S. Appl. No. 16/918,085 dated Mar. 31, 2022.
Non-Final Office Action for U.S. Appl. No. 16/985,444 dated Sep. 3, 2021.
Non-Final Office Action for U.S. Appl. No. 17/016,789 dated Sep. 22, 2022.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/038,323 dated Jul. 1, 2021.
Non-Final Office Action for U.S. Appl. No. 17/094,102 dated Sep. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Action for U.S. Appl. No. 17/206,473 dated Dec. 22, 2022.
Non-Final Office Action for U.S. Appl. No. 17/206,473 dated Jun. 22, 2022.
Non-Final Office Action for U.S. Appl. No. 17/206,737 dated Jun. 23, 2022.
Non-Final Office Action for U.S. Appl. No. 17/206,737 dated Jun. 8, 2023.
Non-Final Office Action for U.S. Appl. No. 17/340,538 dated Oct. 3, 2022.
Non-Final Office Action for U.S. Appl. No. 17/366,738 dated Dec. 9, 2022.
Non-Final Office Action for U.S. Appl. No. 17/408,680 dated Sep. 15, 2022.
Non-Final Office Action for U.S. Appl. No. 17/453,628 dated Sep. 27, 2022.
Non-Final Office Action for U.S. Appl. No. 17/527,817 dated Jun. 15, 2022.
Non-Final Office Action for U.S. Appl. No. 17/708,241 dated Dec. 20, 2022.

(56) References Cited

OTHER PUBLICATIONS

Non-Final Office Action for U.S. Appl. No. 17/734,704 dated Jun. 21, 2023.
Non-Final Office Action for U.S. Appl. No. 17/739,885 dated Mar. 30, 2023.
Non-Final Office Action for U.S. Appl. No. 17/742,468 dated Mar. 30, 2023.
Non-Final Office Action for U.S. Appl. No. 17/830,587 dated Nov. 25, 2022.
Non-Final Office Action for U.S. Appl. No. 17/970,753 dated Aug. 17, 2023.
Non-Final Office Action for U.S. Appl. No. 18/149,332 dated Apr. 27, 2023.
Non-Final Office Action for U.S. Appl. No. 18/153,636 dated Jul. 19, 2023.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Corrected Notice of Allowance for U.S. Appl. No. 17/306,758 dated Dec. 21, 2022.
Corrected Notice of Allowance for U.S. Appl. No. 17/306,758 dated Feb. 15, 2023.
Corrected Notice of Allowance for U.S. Appl. No. 17/306,758 dated Jan. 5, 2023.
Corrected Notice of Allowance for U.S. Appl. No. 17/326,258 dated Apr. 19, 2022.
Corrected Notice of Allowance for U.S. Appl. No. 17/326,258 dated Dec. 22, 2021.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Corrected Notice of Allowance for U.S. Appl. No. 17/326,281 dated Dec. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Corrected Notice of Allowance for U.S. Appl. No. 17/340,166 dated Jun. 2, 2022.
Corrected Notice of Allowance for U.S. Appl. No. 17/340,166 dated Sep. 23, 2022.
Corrected Notice of Allowance for U.S. Appl. No. 17/340,256 dated Feb. 13, 2023.
Corrected Notice of Allowance for U.S. Appl. No. 17/340,256 dated Jan. 6, 2023.
Corrected Notice of Allowance for U.S. Appl. No. 17/340,538 dated Feb. 15, 2023.
Corrected Notice of Allowance for U.S. Appl. No. 17/340,677 dated Dec. 9, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Corrected Notice of Allowance for U.S. Appl. No. 17/688,666 dated Dec. 14, 2022.
Corrected Notice of Allowance for U.S. Appl. No. 17/688,666 dated Dec. 28, 2022.
Corrected Notice of Allowance for U.S. Appl. No. 17/688,666 dated Feb. 10, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Corrected Notice of Allowance for U.S. Appl. No. 17/858,698 dated Jan. 12, 2023.
Corrected Notice of Allowance in U.S. Appl. No. 15/396,453 dated Jun. 13, 2019.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action for U.S. Appl. No. 15/988,308 dated May 6, 2020.
Final Office Action for U.S. Appl. No. 15/986,218 dated Apr. 24, 2019.
Final Office Action for U.S. Appl. No. 15/986,218 dated Jan. 31, 2020.
Final Office Action for U.S. Appl. No. 16/235,445 dated Sep. 3, 2020.
Final Office Action for U.S. Appl. No. 15/988,308 dated May 9, 2019.
Final Office Action for U.S. Appl. No. 15/396,468 dated Dec. 2, 2021.
Final Office Action for U.S. Appl. No. 15/396,468 dated Feb. 10, 2021.
Final Office Action for U.S. Appl. No. 15/396,468 dated Nov. 6, 2019.
Final Office Action for U.S. Appl. No. 15/396,475 dated Feb. 4, 2020.
Final Office Action for U.S. Appl. No. 15/396,614 dated Aug. 12, 2019.
Final Office Action for U.S. Appl. No. 15/986,286 dated Jun. 9, 2020.
Final Office Action for U.S. Appl. No. 15/986,361 dated Dec. 23, 2019.
Final Office Action for U.S. Appl. No. 15/986,406 dated May 26, 2020.
Final Office Action for U.S. Appl. No. 15/986,451 dated Dec. 16, 2019.
Final Office Action for U.S. Appl. No. 15/986,451 dated Sep. 29, 2020.
Final Office Action for U.S. Appl. No. 15/988,241 dated Jan. 8, 2020.
Final Office Action for U.S. Appl. No. 15/988,308 dated Jan. 28, 2021.
Final Office Action for U.S. Appl. No. 15/988,492 dated Jan. 6, 2021.
Final Office Action for U.S. Appl. No. 15/988,492 dated May 28, 2020.
Final Office Action for U.S. Appl. No. 15/988,572 dated Apr. 11, 2023.
Final Office Action for U.S. Appl. No. 15/988,572 dated Jul. 2, 2020.
Final Office Action for U.S. Appl. No. 15/988,572 dated Mar. 10, 2022.
Notice of Allowance for U.S. Appl. No. 16/128,104 dated Dec. 12, 2019.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,268 dated Aug. 24, 2020.
Notice of Allowance for U.S. Appl. No. 16/230,493 dated Feb. 12, 2021.

(56) References Cited

OTHER PUBLICATIONS

Notice of Allowance for U.S. Appl. No. 16/231,467 dated Apr. 16, 2020.
Notice of Allowance for U.S. Appl. No. 16/234,870 dated Aug. 19, 2020.
Notice of Allowance for U.S. Appl. No. 16/235,445 dated Nov. 4, 2020.
Notice of Allowance for U.S. Appl. No. 16/236,713 dated Nov. 18, 2020.
Notice of Allowance for U.S. Appl. No. 16/854,970 dated Oct. 13, 2022.
Notice of Allowance for U.S. Appl. No. 16/895,439 dated Mar. 1, 2022.
Notice of Allowance for U.S. Appl. No. 16/902,775 dated Feb. 2, 2021.
Notice of Allowance for U.S. Appl. No. 16/902,893 dated Feb. 25, 2022.
Notice of Allowance for U.S. Appl. No. 16/918,085 dated Jan. 13, 2023.
Notice of Allowance for U.S. Appl. No. 16/985,444 dated Jan. 10, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/017,241 dated Jul. 15, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/206,473 dated Mar. 30, 2023.
Notice of Allowance for U.S. Appl. No. 17/306,758 dated Sep. 16, 2022.
Notice of Allowance for U.S. Appl. No. 17/326,258 dated Apr. 27, 2022.
Notice of Allowance for U.S. Appl. No. 17/326,258 dated Nov. 17, 2021.
Notice of Allowance for U.S. Appl. No. 17/326,281 dated Dec. 7, 2022.
Notice of Allowance for U.S. Appl. No. 17/340,166 dated Mar. 21, 2022.
Notice of Allowance for U.S. Appl. No. 17/340,538 dated Jan. 23, 2023.
Notice of Allowance for U.S. Appl. No. 17/340,677 dated Aug. 8, 2022.
Notice of Allowance for U.S. Appl. No. 17/408,680 dated Jul. 20, 2023.
Notice of Allowance for U.S. Appl. No. 17/408,739 dated Jul. 5, 2023.
Notice of Allowance for U.S. Appl. No. 17/453,628 dated Mar. 2, 2023.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/731,049 dated Mar. 2, 2023.
Notice of Allowance for U.S. Appl. No. 17/742,468 dated Aug. 15, 2023.
Notice of Allowance for U.S. Appl. No. 17/830,587 dated Mar. 9, 2023.
Notice of Allowance for U.S. Appl. No. 17/830,788 dated Dec. 9, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Notice of Allowance for U.S. Appl. No. 17/986,403 dated Apr. 7, 2023.
Notice of Allowance for U.S. Appl. No. 18/149,332 dated Aug. 11, 2023.
Notice of Allowance for U.S. Appl. No. 18/157,294 dated Jul. 11, 2023.
Notice of Allowance for U.S. Appl. No. 18/158,202 dated May 25, 2023.
Notice of Allowance for U.S. Appl. No. 18/160,833 dated Jun. 14, 2023.
Notice of Allowance for U.S. Appl. No. 18/161,957 dated Jul. 11, 2023.
Non-Final Office Action in U.S. Appl. No. 15/986,218 dated Nov. 28, 2018.
Non-Final Office Acton for U.S. Appl. No. 17/016,789 dated Dec. 21, 2021.
Non-Final Rejection Mailed on Dec. 3, 2024 for U.S. Appl. No. 18/635,550, 13 page(s).
Non-Final Rejection Mailed on Dec. 20, 2023 for U.S. Appl. No. 18/319,898, 10 page(s).
Non-Final Rejection Mailed on Jan. 16, 2025 for U.S. Appl. No. 18/748,775, 14 page(s).
Non-Final Rejection Mailed on Jan. 27, 2025 for U.S. Appl. No. 18/766,103, 9 page(s).
Non-Final Rejection Mailed on Jan. 30, 2025 for U.S. Appl. No. 18/734,196, 8 page(s).
Non-Final Rejection Mailed on Jun. 13, 2024 for U.S. Appl. No. 18/323,582, 13 page(s).
Non-Final Rejection Mailed on Jun. 18, 2024 for U.S. Appl. No. 17/394,265, 12 page(s).
Non-Final Rejection Mailed on Jun. 18, 2024 for U.S. Appl. No. 18/508,682, 7 page(s).
Non-Final Rejection Mailed on Mar. 26, 2025 for U.S. Appl. No. 18/323,582, 10 page(s).
Non-Final Rejection Mailed on Nov. 21, 2024 for U.S. Appl. No. 18/620,001, 12 page(s).
Non-Final Rejection Mailed on Sep. 19, 2024 for U.S. Appl. No. 18/433,662, 16 page(s).
Notice of Allowability for U.S. Appl. No. 15/986,241 dated Aug. 18, 2020.
Notice of Allowability for U.S. Appl. No. 16/918,085 dated Mar. 1, 2023.
Notice of Allowability for U.S. Appl. No. 15/986,361 dated Aug. 18, 2020.
Notice of Allowability for U.S. Appl. No. 15/986,361 dated Jul. 14, 2020.
Notice of Allowability for U.S. Appl. No. 15/986,361 dated May 15, 2020.
Notice of Allowability for U.S. Appl. No. 15/986,361 dated Sep. 30, 2020.
Notice of Allowability for U.S. Appl. No. 16/092,893 dated Jun. 8, 2022.
Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated Jul. 20, 2022.
Notice of Allowability for U.S. Appl. No. 16/902,893 dated May 13, 2022.
Notice of Allowability for U.S. Appl. No. 17/839,649 dated Jan. 25, 2023.

(56) References Cited

OTHER PUBLICATIONS

Notice of Allowance and Fees Due (PTOL-85) Mailed on Apr. 7, 2025 for U.S. Appl. No. 17/746,531, 2 page(s).
Notice of Allowance and Fees Due (PTOL-85) Mailed on Apr. 14, 2025 for U.S. Appl. No. 17/394,265, 10 page(s).
Notice of Allowance and Fees Due (PTOL-85) Mailed on Aug. 21, 2023 for U.S. Appl. No. 17/739,885, 8 page(s).
Notice of Allowance and Fees Due (PTOL-85) Mailed on Feb. 15, 2023 for U.S. Appl. No. 17/340,538, 6 page(s).
Notice of Allowance and Fees Due (PTOL-85) Mailed on Jan. 4, 2024 for U.S. Appl. No. 18/147,421, 8 page(s).
Notice of Allowance and Fees Due (PTOL-85) Mailed on Jan. 12, 2024 for U.S. Appl. No. 18/147,421, 2 page(s).
Notice of Allowance and Fees Due (PTOL-85) Mailed on Jan. 28, 2025 for U.S. Appl. No. 17/746,531, 8 page(s).
Notice of Allowance and Fees Due (PTOL-85) Mailed on Jul. 12, 2021 for U.S. Appl. No. 15/396,475, 2 page(s).
Notice of Allowance and Fees Due (PTOL-85) Mailed on Mar. 9, 2023 for U.S. Appl. No. 17/326,281, 2 page(s).
Notice of Allowance and Fees Due (PTOL-85) Mailed on Mar. 26, 2025 for U.S. Appl. No. 17/746,531, 2 page(s).
Notice of Allowance and Fees Due (PTOL-85) Mailed on Oct. 18, 2023 for U.S. Appl. No. 17/734,704, 8 page(s).
Notice of Allowance for U.S. Appl. No. 16/299,310 dated Dec. 14, 2020.
Notice of Allowance for U.S. Appl. No. 17/708,241 dated Apr. 5, 2023.
Notice of Allowance for U.S. Appl. No. 15/396,624 dated May 31, 2019.
Notice of Allowance for U.S. Appl. No. 15/396,468 dated Mar. 18, 2022.
Notice of Allowance for U.S. Appl. No. 15/396,475 dated Feb. 5, 2021.
Notice of Allowance for U.S. Appl. No. 15/986,218 dated Jul. 13, 2020.
Notice of Allowance for U.S. Appl. No. 15/986,361 dated Apr. 8, 2020.
Notice of Allowance for U.S. Appl. No. 15/986,406 dated Mar. 3, 2021.
Notice of Allowance for U.S. Appl. No. 15/986,451 dated May 5, 2021.
Notice of Allowance for U.S. Appl. No. 15/988,241 dated Aug. 26, 2020.
Notice of Allowance for U.S. Appl. No. 15/988,241 dated Mar. 18, 2020.
Notice of Allowance for U.S. Appl. No. 15/988,308 dated Jul. 30, 2021.
Notice of Allowance for U.S. Appl. No. 15/988,492 dated Jul. 30, 2021.
Corrected Notice of Allowance for U.S. Appl. No. 16/229,497 dated Jun. 3, 2021.
Corrected Notice of Allowance for U.S. Appl. No. 16/229,614 dated Jun. 29, 2021.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/235,445 dated Mar. 26, 2021.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 16/895,439 dated Sep. 14, 2022.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jun. 11, 2021.
Corrected Notice of Allowance for U.S. Appl. No. 16/902,893 dated Sep. 19, 2022.
Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 16/985,444 dated Mar. 25, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,145 dated Jun. 2, 2022.
Corrected Notice of Allowance for U.S. Appl. No. 17/017,145 dated Mar. 4, 2022.
Corrected Notice of Allowance for U.S. Appl. No. 17/017,145 dated May 17, 2022.
Corrected Notice of Allowance for U.S. Appl. No. 17/017,145 dated Sep. 15, 2022.
Corrected Notice of Allowance for U.S. Appl. No. 17/017,241 dated Aug. 3, 2022.
Corrected Notice of Allowance for U.S. Appl. No. 17/017,241 dated Dec. 2, 2022.
Corrected Notice of Allowance for U.S. Appl. No. 17/017,241 dated Oct. 20, 2022.
Corrected Notice of Allowance for U.S. Appl. No. 17/038,323 dated Apr. 19, 2022.
Corrected Notice of Allowance for U.S. Appl. No. 17/038,323 dated Feb. 2, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,102 dated Mar. 10, 2022.
Corrected Notice of Allowance for U.S. Appl. No. 17/094,102 dated May 17, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.

(56) References Cited

OTHER PUBLICATIONS

Corrected Notice of Allowance for U.S. Appl. No. 17/094,319 dated Sep. 23, 2022.
Corrected Notice of Allowance for U.S. Appl. No. 17/147,887 dated Jul. 22, 2022.
Corrected Notice of Allowance for U.S. Appl. No. 17/147,887 dated May 18, 2022.
Corrected Notice of Allowance for U.S. Appl. No. 17/147,887 dated Oct. 11, 2022.
Final Rejection Mailed on Apr. 8, 2026 for U.S. Appl. No. 18/766,103, 11 page(s).
Non-Final Rejection Mailed on Apr. 2, 2026 for U.S. Appl. No. 19/029,425, 14 page(s).
Non-Final Rejection Mailed on Apr. 2, 2026 for U.S. Appl. No. 19/030,469, 13 page(s).
Non-Final Rejection Mailed on Apr. 8, 2026 for U.S. Appl. No. 18/819,563, 15 page(s).
Non-Final Rejection Mailed on Jan. 27, 2026 for U.S. Appl. No. 18/323,582, 11 page(s).
Final Rejection Mailed on Jul. 14, 2026 for U.S. Appl. No. 18/323,582, 12 page(s).

* cited by examiner

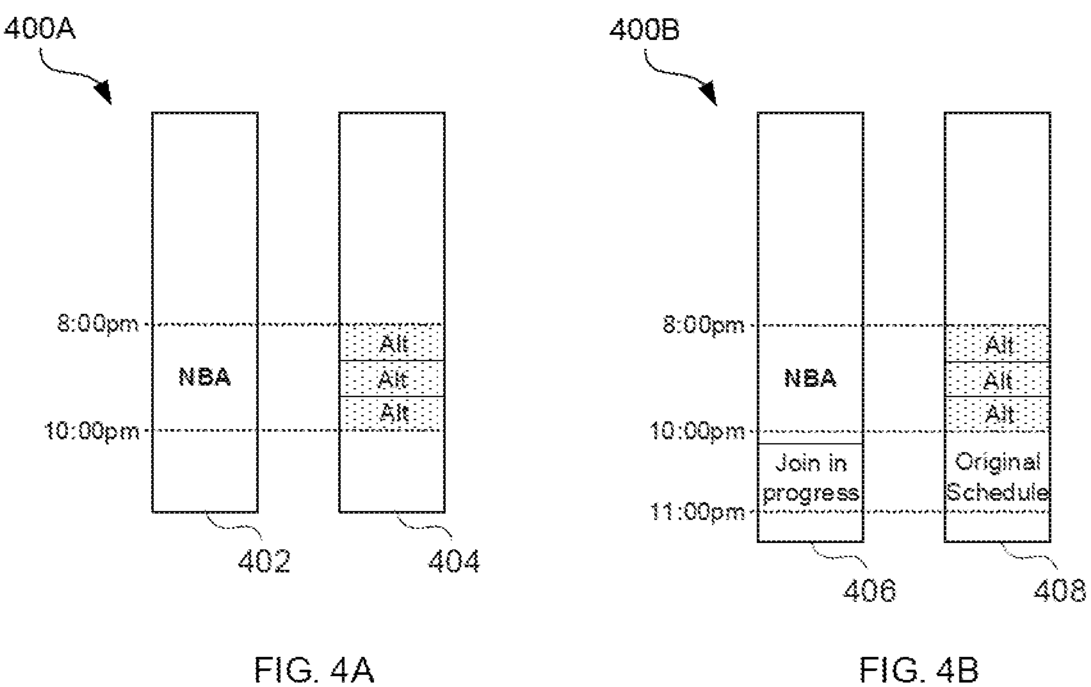
FIG. 4A
FIG. 4B
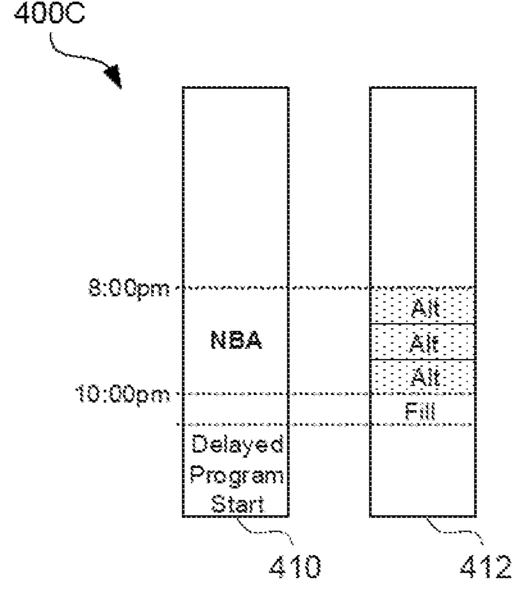
FIG. 4C

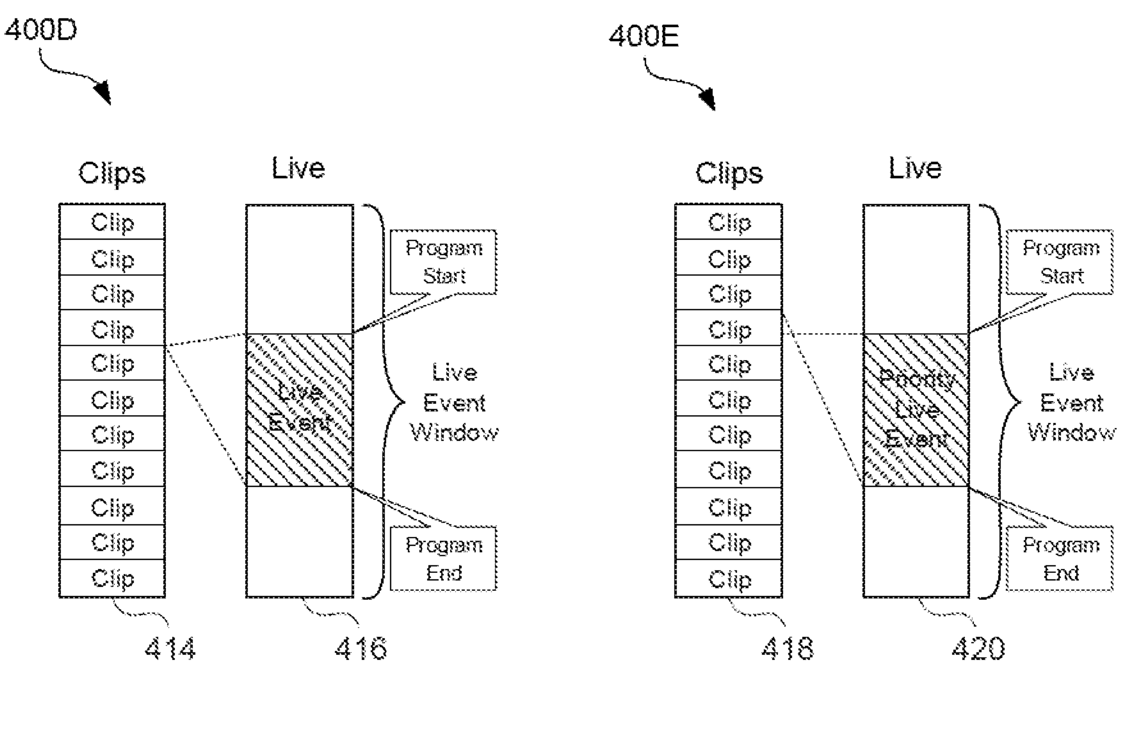
FIG. 4D
FIG. 4E
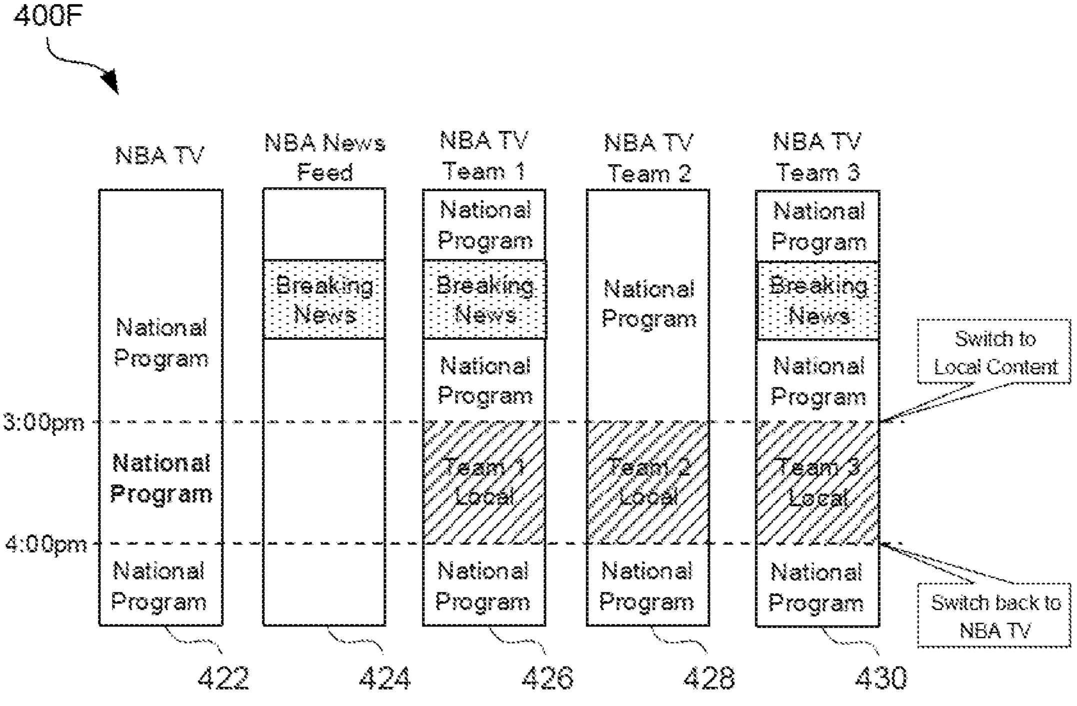
FIG. 4F

PUBLISHING DISPARATE LIVE MEDIA OUTPUT STREAMS IN MIXED MODE

CROSS-REFERENCE TO RELATED APPLICATIONS/INCORPORATION BY REFERENCE

This Patent Application is a continuation of U.S. patent application Ser. No. 18/323,582, filed on May 25, 2023, which is a continuation of U.S. patent application Ser. No. 17/340,538, filed on Jun. 7, 2021, which is further a Continuation of U.S. Pat. No. 11,109,086, issued on Aug. 31, 2021, which is Continuation-in-part of U.S. Pat. No. 11,134,309, issued on Sep. 28, 2021, and claims priority to, and the benefit from U.S. Provisional Application Ser. No. 62/699,131, filed Jul. 17, 2018.

This application also makes reference to:

U.S. Pat. No. 10,856,016, issued on Dec. 1, 2020;

U.S. Pat. No. 10,924,804, issued on Feb. 16, 2021;

U.S. Pat. No. 10,992,973, issued on Apr. 27, 2021;

U.S. Pat. No. 11,051,061, issued on Jun. 29, 2021; and

U.S. Pat. No. 11,051,074, issued on Jun. 29, 2021.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing disparate live media output streams in mixed mode.

BACKGROUND

The past decade has witnessed a massive expansion of live web simulcast services in the field of advertisement-based broadcasting and cable networking systems. Usually, broadcasting platforms refer to the types of networks that are used to deliver the media content to the consumers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal by retaining the audience viewing the media content.

Modern web streaming protocols, such as HTTP Live Streaming (HLS) and Dynamic Adaptive Streaming over HTTP (DASH), are implemented to support streaming of live content services, such as DIRECTV NOW$^{SM}$, SLING TV$^{SM}$ and PLAYSTAYION™ VUE, to consumer devices. In certain scenarios, with live content services, such as live sports, there may be geographic restrictions on where events may or may not be made available. Further, rights restrictions associated with the delivery of certain media content may also be there over the Internet. Since the media content is required to be processed and encoded beyond the initial creation of the live streams prepared for distribution, it is extremely expensive to provide the multiple disparate live media output streams to consumer devices.

Given the trends toward media content distribution, there is required a system to eliminate the need for a high cost broadcast infrastructure and deliver live channels with various restrictions and high cost for web distribution. An advanced system may be required that provides the network provider with the capability to not only provide new channel offerings in cost-effective manner but also provide enhanced and intelligent viewer experience to increase their appeal in order to gain a wider audience and retain the audience viewing the media content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing disparate live media output streams in mixed mode, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 4A to 4F illustrate various second exemplary scenarios associated with playout of a disparate live media output stream, in accordance with an exemplary embodiment of the disclosure.

DETAILED DESCRIPTION OF THE DISCLOSURE

Certain embodiments of the disclosure may be found in a method and system for publishing disparate live media output streams in mixed mode. Various embodiments of the disclosure provide a method and system that simplifies live channel creation, and gives the network provider the capability to not only provide live channel offerings in cost-effective manner but also provide enhanced viewer experience to increase their appeal by retaining the audience viewing the media content.

Modern streaming protocols, such as HLS and DASH, break media content into numerous small media content segments, typically less than 10 seconds in length. Further, the modern web streaming protocols implement manifests that instruct a media player what media content segment to retrieve and play next. The manifest may enlist all the media segments that make up the full length of the media asset. The manifest may include information, based on which the media player at a consumer device may be able to determine all the media segments. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern streaming protocols support video-on-demand (VOD) assets and live content as well. The VOD assets prepared for distribution, for example Internet distribution, may have a sequence of short duration segments added to a manifest. The short duration segments may be separate physical files or pointers (real or to be calculated) to the short media content segments inside a larger file. On the other hand, in case of live content, new short content media segments are made available as soon as they are created. In some protocols, each new segment is added to a manifest while in others the media player is provided necessary information to calculate what the next live segment will be. In the latter case, a signal in the media content itself is used to inform the media player when they need to re-inspect the manifest for a change in media content. In live streaming, delivery of live content is supported by making available each new short media content segments as soon as such media content segments are generated. In some protocols, new media content segments may be added to the manifest, while in others, the media player calculates necessary information about the next live media content segments.

Figure 1A:
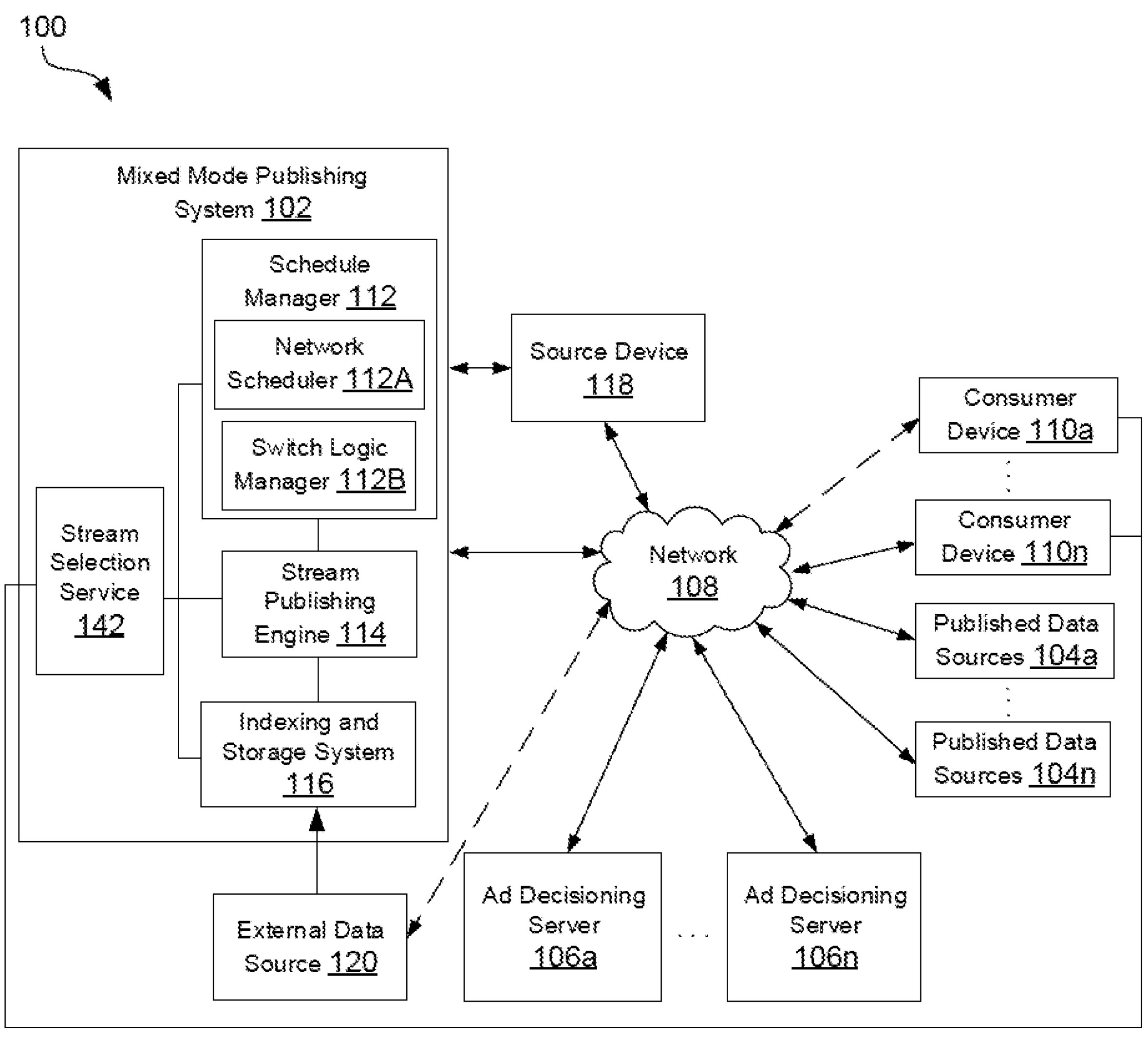
FIG. 1A is a block diagram that illustrates an exemplary system for publishing disparate live media output streams in mixed mode, in accordance with an exemplary embodiment of the disclosure.

In accordance with various embodiments of the disclosure, a mixed mode publishing system or apparatus is provided for publishing disparate live media output streams in mixed mode to be viewed on a plurality of consumer devices. One or more processors in the stream publishing engine may be configured to generate a plurality of disparate live output stream manifests based on one or more live input streams, one or more corresponding live input stream manifests, one or more pre-encoded media assets, one or more corresponding pre-encoded media asset manifests, one or more additional parameters, and/or one or more programming schedules. In an instance in which a disparate live media output stream manifest is generated based on a first live input stream, the one or more processors may identify the one or more programming schedules and/or one or more events in a first live input stream manifest associated with the first live input stream. The one or more processors may insert, based on a transition due to the identified one or more programming schedules and/or one or more events in the first live input stream manifest, at least one of a second live input stream manifest and/or one of the one or more pre-encoded media asset manifests to the disparate live output stream manifest. The one or more processors may further publish the disparate live output stream manifest to a content delivery system. In an instance in which the disparate live media output stream manifest is generated based on a first pre-encoded media asset the one or more processors may identify the one or more programming schedules and/or the one or more events in a first pre-encoded media asset manifest associated with the first pre-encoded media asset, and/or one or more events in the second live input stream manifest defined in the one or more programming schedules. The one or more processors may insert, based on another transition due to the identified one or more events, at least one of a second pre-encoded media asset manifest and/or the one of the one or more live input stream manifests to the disparate live output stream manifest. The one or more processors may publish the disparate live output stream manifest to the content delivery system FIG. 1A is a block diagram that illustrates an exemplary system for publishing disparate live media output streams in mixed mode, in accordance with an exemplary embodiment of the disclosure. Referring to FIG. 1A, the system 100, comprises a mixed mode publishing system 102 that is communicatively coupled to published data sources 104*a*, . . . , 104*n*, Ad decisioning servers 106*a*, . . . , 106*n*, via a network 108 and/or other programmatic means. There are shown consumer devices 110*a*, . . . , 110*n* that are communicatively coupled to the network 108. The mixed mode publishing system 102 may comprise at least a schedule manager 112, a stream publishing engine 114, an indexing and storage system 116, and a stream selection service 142. The schedule manager 112 may further include a network scheduler 112A and a switch logic manager 112B. There are also shown source devices 118 communicatively coupled to the mixed mode publishing system 102 through the network 108. An external data source 120 is also provided, which is communicatively coupled to the mixed mode publishing system 102 through the network 108.

The mixed mode publishing system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata.

In this regard, the mixed mode publishing system 102 may provide video programming services to viewers, usually for a subscription fee (such as pay television). The mixed mode publishing system 102 generates a plurality of disparate live media output streams to be viewed on the plurality of consumer devices 110*a*, . . . , 110*n*. The mixed mode publishing system 102 also handles distribution, for example, multicasting, unicasting, broadcasting, streaming, of one or more channels to be viewed on one or more of the plurality of consumer devices 110*a*, . . . , 110*n*.

The mixed mode publishing system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs) (or content delivery systems). In this regard, the broadcast provider may be configured to execute code that communicates linear video feeds (also referred to as a network television feed or broadcast feed) to the mixed mode publishing system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus. The communicated linear video feed and the playout schedule may correspond to a channel, such as CNN channel that is broadcast to the mixed mode publishing system 102, via a communication network. The linear video feed may be broadcasted as a multi-program transport stream (MPTS). In an embodiment, a live stream encoder/packager may be configured to convert the MPTS to web distribution protocols prior to feeding to the mixed mode publishing system 102, via the network 108. The broadcast provider may be owned by (or associated to) a broadcast provider or operator, a network provider or operator, or a content provider or operator.

The mixed mode publishing system 102 may receive the web distribution protocols, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the mixed mode publishing system 102 may be signaled for various blackout types with in-band SCTE-35 message. Further, the mixed mode publishing system 102 may receive program metadata that specifies certain events or operations, such as, for example, when to blackout content. The mixed mode publishing system 102 may benefit various entities, for example direct-broadcast satellite (DBS) providers, cable television (CATV) systems, and other wireline video providers and competitive local exchange carriers (CLECs) using, for example, IPTV.

Each of the plurality of published data sources 104*a*, . . . , 104*n* may be coupled to one or more television networks and may comprise suitable logic, circuitry, and interfaces that may be configured to execute code that provides actual audiences for programs that were distributed. As illustrated in FIG. 1A, the plurality of published data sources 104*a*, . . . , 104*n* are coupled to the mixed mode publishing system 102 via the network 108 and configured to monitor audience drift to or away from a tuned channel airing a live media output stream. The plurality of published data sources 104*a*, . . . , 104*n* may provide actual audiences for programs to the indexing and storage system 116. An exemplary published data source may be Nielsen. Nielsen has the capability to determine when a viewer watches the same set of media items, for example, advertisements and/or promotional content, in programming data, such as an episode, in a live video feed within 3 days of original airing and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106*a*, . . . , 106*n* may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams by the Ad decisioning servers 106*a*, . . . , 106*n* based on the upcoming indicator detected by the media player or the non-programming content proxy server. The detected indicator may be, for example, an inbound trigger, a signaling point, and/or a signal in a pre-encoded media asset and/or a live input stream. The Ad decisioning servers 106*a*, . . . , 106*n* may receive a request for retrieval of non-programming content, for example, ads, from a proxy server (not shown). Specifically, the Ad decisioning servers 106*a*, . . . , 106*n* may receive the request from one or more of the plurality of consumer devices 110*a*, . . . , 110*n*, via the proxy server (not shown). The request may be received when one or more indicators and/or pre-encoded place holder content segment for a scheduled duration of one or more non-programming content breaks. The scheduled durations of one or more non-programming content breaks may be defined by a received programming schedule, and are encountered in the disparate live media output stream manifest during media content playout by media players at the one or more of the plurality of consumer devices 110*a*, . . . , 110*n*.

Thus, for requests received from the plurality of consumer devices 110*a*, . . . , 110*n*, based on corresponding disparate live media output stream manifests, the Ad decisioning servers 106*a*, . . . , 106*n* may identity the opportunities for the real-time content or advertisement placement activity. In this regard, as the advertisement decisioning component of the Ad decisioning servers 106*a*, . . . , 106*n* is implemented in a consumer device, such as one or more of the plurality of consumer devices 110*a*, . . . , 110*n*, the Ad decisioning servers 106*a*, . . . , 106*n* may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106*a*, . . . , 106*n* when the ad decisioning component is implemented in the consumer device. In various embodiments, the advertisement decisioning component of the Ad decisioning servers 106*a*, . . . , 106*n* may be configured to determine which advertisements, overlay graphics and presentation information to serve to the consumer devices 110*a*, . . . , 110*n* based on stream ID, a program ID, a geographical location, time, and any preferences associated with an individual consumer or an advertisement ID specified by the disparate live media output stream manifest.

The network 108 may be any kind of network, or a combination of various networks, and it is shown illustrating the communication that may occur between the Ad decisioning servers 106*a*, . . . , 106*n* and the mixed mode publishing system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110*a*, . . . , 110*n* may refer to end-user devices or consumption devices where the content is played to be consumed by a user. The number of impressions of a media item, such as an advertisement and/or promotional media, on such plurality of consumer devices 110*a*, . . . , 110*n* determines the advertising impact or promotion impact and number of actual audiences achieved during campaigns. Examples of the consumer devices 110*a*, . . . , 110*n* may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110*a*, . . . , 110*n* may further include process/system that may process the output for any means, regardless of the capability or intent to decode for media presentation, and on which the consumer may launch a web page, a web application, or a web service to view media content.

The schedule manager 112 may comprise suitable logic, circuitry, and interfaces that may be configured to execute a code that creates and handles a programming schedule of programming media content, such as pre-encoded (or on-demand media assets) and live input streams, for a channel. The schedule manager 112 may include a network scheduler 112A configured to manage a media assets programming schedule for the pre-encoded media assets, and a switch logic manager 112B configured to manage a live programming schedule for the live input streams.

The media assets programming schedule of the pre-encoded media assets for the channel defines which pre-encoded media assets should be scheduled, time and duration at which the pre-encoded media assets should be played in the generated disparate live media output streams, the ordering of the pre-encoded media assets during playout, and when to distribute the media content to the consumer devices 110*a*, . . . , 110*n* over the web application, service or page. The network scheduler 112A may create the media assets programming schedule based on a desired theme, content metadata, content rights, content eligibility, and content availability of the pre-encoded or on-demand media assets. The network scheduler 112A may also format non-programming break, such as ad break, durations and locations, as well as graphic overlay locations on the pre-encoded or on-demand media assets displayed on the consumer devices 110*a*, . . . , 110*n*. The media content that is distributed may include both the programming content, such as long-form presentations, short-form presentations, news or sporting events, and non-programming content, such as paid advertisements, public service advertisements, or promotional material.

In accordance with an embodiment, the media assets programming schedule and the live programming schedule may comprise data structures or file formats capable of being processed by a computer, that comprise a reference mapping of different media content items that needs to be utilized by the schedule manager 112. For example, the network scheduler 112A may receive a programming schedule of an existing channel from the source devices 118. The network scheduler 112A may modify the received programming schedule to generate the media assets programming schedule. The generation of the programming schedule may be driven by real time or near-real time content context analysis, content rights, user preferences, user-selection on a consumer device, such as the consumer devices 110*a*, . . . , 110*n*, or driven by external data received from the external data source 120. The generation of the media assets programming schedule may enable publishing another disparate live media output stream using pre-encoded media assets. The media content, for example, that is distributed may include both the programming media content, such as long-form presentations, short-form presentations, news or sporting events, and non-programming media content, such as paid advertisements, public service advertisements, or promotional material.

The live programming schedule defines which live input streams should be scheduled, time and duration at which the live input streams should be played in the generated disparate live media output streams, the ordering of the live input streams during playout, and when to distribute the media content to the consumer devices 110*a*, . . . , 110*n* over the web application, service or page. The switch logic manager 112B may create the live programming schedule by leveraging the media assets programming schedules generated by the network scheduler 112A, various live input stream schedules, rights and preferences databases, and data provided by a stream owner/operator. The switch logic manager 112B may also determine required number of disparate live media output streams. For example, the switch logic manager 112B may determine that corresponding to live input streams from 35 regional sources, based on schedules, rights, and user preferences, 210 or more disparate live media output streams may be generated. In an embodiment, The switch logic manager 112B may modify (or update) the received programming schedule to generate a live programming schedule, where the generation of the updated programming schedule may be driven by real time or near-real time content context analysis, content rights, user preferences, stream selection service 142, schedules, content and rights databases, user-selection on a consumer device, such as the consumer devices 110*a*, . . . , 110*n*, or driven by external data received from the external data source 120.

In accordance with an embodiment, the media assets programming schedule and the live programming schedule may be XML files or data sets, which may comprise a reference mapping of different media content items or media segments of the pre-encoded media assets and live input streams, respectively. The schedule manager 112 may be configured to communicate the programming schedule, such as the media assets programming schedule (from the network scheduler 112A) or the live programming schedule (from the switch logic manager 112B), to the stream publishing engine 114 for publishing disparate live media output streams.

The stream publishing engine 114 may comprise suitable logic, circuitry, and interfaces that may be configured to execute a code to generate a disparate live media output stream for a new channel to be viewed on a consumer device in accordance with the specified programming schedule. The stream publishing engine 114 may be configured to generate disparate live media output stream manifests by publishing unique streaming live media output stream manifests leveraging different indices created by the indexing and storage system 116, based on the generated programming schedule. Accordingly, the stream publishing engine 114 may generate a specific disparate live media output stream to be delivered to one or more of the plurality of consumer devices 110*a*, . . . , 110*n* over a web page, service or application, based on manipulated manifests. In accordance with an embodiment, the stream publishing engine 114 may be configured to insert media segments that are referenced by manifests associated with a plurality of pre-encoded media assets and/or live input streams indexed by the indexing and storage system 116 into a disparate live media output stream manifest on defined intervals. The defined intervals may equal to content segment duration to generate a disparate live media output stream for a new channel. The manifest may correspond to the data set that may instruct the consumer devices 110*a*, . . . , 110*n* which and where to acquire the live input streams to play. The disparate live media output stream, thus generated, is in a suitable state (or ready) to be distributed to web media players in one or more of the plurality of consumer devices 110*a*, . . . , 110*n* without a requirement to re-encode the pre-encoded media assets and/or the live input streams before the web distribution of the disparate live media output stream for the new channel.

In this regard, the disparate live media output stream may be tailored for a single consumer device 110*a*, or for a plurality of the consumer devices 110*a*, . . . , 110*n*. The decisioning as to which the pre-encoded media assets and/or live input streams to select for delivery over the network 108 to the one or more of the plurality of consumer devices 110*a*, . . . , 110*n* may be based on the manipulation of the manifests that correspond to the programming schedules in real time or near-real time. The manipulation of the manifests correspond to the programming schedules that may be driven by, for example real time or near-real time content context analysis, content rights, user preferences, user-selection on the consumer devices 110*a*, . . . , 110*n*, or external data received from the external data source 120, in addition to the real-time data, such as schedules, rights, and preferences databases, and stream operator preferences, received from various databases, as described in detail in FIG. 1B. The stream publishing engine 114 may also be referred to as a stream manipulator that may be configured to insert media segments from the pre-encoded media assets and/or live input streams, in an existing program stream, based on manipulation of manifests corresponding to programming schedule of the existing program stream, such as an existing channel.

The indexing and storage system 116 may comprise suitable logic, circuitry, and interfaces that may be configured to be continuously ingested with a plurality of manifests associated with the pre-encoded media assets and/or the plurality of live input streams. The indexing and storage system 116 may also store, maintain, process, and generate alerts. In accordance with an embodiment, the indexing and storage system 116 may be configured to ingest the manifests of the pre-encoded media assets and/or the live input streams, and index the listed media segments, indexing of program boundaries and tags marking, advertisement break locations, overlay opportunities credits, digital rights management systems supported in the indexing and storage system 116.

The source devices 118 may comprise suitable logic, circuitry, and interfaces that may be configured to communicate a live media feed or live input streams of a channel, such as an existing channel, to the mixed mode publishing system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110*a*, . . . , 110*n*. The audience data may include demographics data, audience targeting data, trending data, device type data, device platform data, and content recognition-based data, such as automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

In operation, the mixed mode publishing system 102 may be configured to generate a plurality of disparate live output stream manifests based on one or more live input stream manifests, one or more pre-encoded media asset manifests, one or more additional parameters, and/or one or more programming schedules. The one or more additional parameters comprise information pertaining to preferred media content, demographic data, geographic location of consumer, and rights associated with the one or more live input streams, or the one or more pre-encoded media assets.

In an embodiment, the network scheduler 112A may be configured to schedule alternate pre-encoded media assets for a disparate live media output stream programming schedule published for a consumer device, for example the first consumer device 110*a*. The alternate pre-encoded media assets may be scheduled at the time of the consumer device transition points, possible live event overruns, or when local content is available to replace national content. Alternatively, the network scheduler 112A may schedule a live input stream to potentially be inserted into a disparate live media output stream (comprising pre-encoded media assets) to cover a scheduled live event or allow for a switch to live breaking news, for example. The indexing and storage system 116 may retrieve and index the pre-encoded media assets from a media content master storage system in case the pre-encoded media assets are not indexed. In an embodiment, a live stream encoder/packager may be configured to encode and package a plurality of live feeds received from the source devices 118 to generate a plurality of live feeds. The mixed mode publishing system 102 may store such plurality of live input streams and corresponding live input stream manifests in a content delivery system.

The switch logic manager 112B may be configured to leverage the media assets programming schedules generated by the network scheduler 112A, various live input stream schedules, rights and preferences databases, and data provided by the stream owner/operator 144. Accordingly, the switch logic manager 112B may be configured to generate live programming schedules for a required number of output channels needed to satisfy the various content rights, regional rights and preferences, and user preferences. The schedule manager 112 may be configured to provide the programming schedules to the indexing and storage system 116, stream publishing engine 114, the stream selection service 142, and a program guide service.

Manifests for the pre-encoded media assets and live input streams enlisted in the programming schedules may be ingested into the indexing and storage system 116. In accordance with an embodiment, a proprietary manifest format may be implemented between encoders/packagers for pre-encoded media assets and live input streams, and the indexing and storage system 116, in case additional information is required to be inserted, which is not traditionally carried in a published manifest.

The indexing and storage system 116 may be configured to index media content segments from each pre-encoded media asset manifest. The indexing and storage system 116 may be further configured to continuously index the media content segments from each of the live input stream manifests, creating a media content segment buffer for each live input stream. Thus, a live input stream may be joined back in the media content segment buffer at a program boundary and also program restart may be enabled, if allowed. The indexing and storage system 116 further logs all tags indicating ad breaks, program start, program end, and the like for the pre-encoded media assets and live input streams. Based on the tags in manifests, transitions between live input streams and pre-encoded media assets, according to the stream owner/operator preferences as detailed by the switch logic manager 112B, may be handled correctly. Further, the tags enable insertion of additional information in the disparate live media output stream manifest to help the media player transition smoothly between media content from different live input streams and pre-encoded media assets, including but not limited to, discontinuity tags. The indexing and storage system 116 may be further configured to validate the pre-encoded media assets and live input streams for acceptability and confirm that the pre-encoded media assets and live input streams are ready for inclusion in a disparate live media output stream manifest.

At the schedule time, the stream publishing engine 114 may be configured to switch a live input stream or a pre-encoded media asset in the disparate live media output stream. The switching may be performed by the stream publishing engine 114 by inserting media content segments from the indexed live input stream or pre-encoded media asset manifests into the disparate live media output stream manifest. In certain embodiments, an in-band trigger may be required in the live input stream to instruct the media player to check for a manifest change and signal a change in one or more protocols.

In an embodiment, the stream publishing engine 114 may encounter indicators, such as tags or break points marking an ad break, for example, in the live input stream manifest or pre-encoded media asset manifest. The stream publishing engine 114 may insert such tags or break points in the disparate live media output stream manifest based on the programming schedule. In accordance with an embodiment, the or pre-encoded media asset manifest or the live input stream manifest may contain burned-in non-programing content, for example, ads, but requires digital ad insertion. In such cases, the stream publishing engine 114 may stitch in pre-encoded slate content segments for the scheduled duration of the break as defined by the programming schedule.

In an embodiment, the stream publishing engine 114 may encounter other indicators, such as credit and overlay tags, in the scheduled live input stream manifest or pre-encoded media asset manifest. In such cases, the stream publishing engine 114 may insert the indicators into the generated disparate live output stream manifest as defined by the programming schedule. For pre-encoded media assets, the stream publishing engine 114 may also communicate directly with a media content metadata storage system to receive new tag locations that may not have been included in the pre-encoded media asset manifest. In an embodiment, the stream publishing engine 114 may be instructed by the programming schedule to insert one or more overlay tags, for example, at defined time stamps in the generated disparate live output stream manifest, in case the one or more overlay tags, such as a network logo, are not specific to the pre-encoded media assets.

In an embodiment, the stream selection service 142 may be configured to leverage the rights and preferences databases, content demographic data provided for the pre-encoded media assets scheduled by the network scheduler 112A, along with the list of disparate live output streams defined by the switch logic manager 112B, to generate a repository of which consumers should join which disparate live output stream. The repository may further include geo location of the consumer devices 110*a*, . . . , 110*n*, as determined by a third party system or other application configured to determine the geographical location of the consumer devices 110*a*, . . . , 110*n*. The repository may further include individual user preferences, such as a user associated with the first consumer device 110*a* is not an NBA fan. The repository may further include a combination of all factors to meet both content rights restrictions as well as user preferences and viewer account data for additional service tiers.

When the first consumer device 110*a* requests to join a disparate live output stream with available variants, the first consumer device 110*a*, directly or via a proxy server, may be configured to connect to the stream selection service 142. Accordingly, the stream selection service 142 may provide the first consumer device 110*a* with a correct disparate live output stream manifest based on geo location, preferences and service level of the first consumer device 110*a*. The first consumer device 110*a* may access the program guide service to determine what media content is currently being played by the media player and what media content is coming up next. For example, if a user associated with the consumer device 110*b* is an NBA fan, the user may view a disparate live media output stream with NBA highlights before an upcoming game, instead of the last 10 minutes of a crime drama that airs before the NBA game on the broadcast channel that user has tuned to. In another example, if the user associated with the first consumer device 110*a* is not an NBA fan, the user may view a disparate live media output stream that may show more crime dramas instead of the NBA game.

Upon joining a disparate live media output stream, a user associated with the first consumer device 110*a* stays connected to the disparate live media output stream. All required media content switching is performed by the stream publishing engine 114. The stream publishing engine 114 provides for a smooth transition between different live input streams and pre-encoded media content without the media player having to re-buffer. In certain embodiments, multiple disparate live media output streams may have equal weighting based on the available criteria. In other embodiments, no information to the mixed mode publishing system 102 is known about the user associated with the first consumer device 110*a*. In such embodiments, the user may be presented with the available options for the disparate live media output streams, and the user may actively select a disparate live media output stream. Such action or inaction by the user may be recorded in user preferences database and may be utilized to inform future decisions.

The first consumer device 110*a* may access the Ad decisioning server 106*a*, for example, whenever the media player encounters one or more events, such as an ad break tag or an overlay tag. Alternatively, the first consumer device 110*a* may access a proxy server and the proxy server may be configured to access the Ad decisioning server 106*a* for making the ad calls on behalf of the first consumer device 110*a*. Upon receiving ad segments from the Ad decisioning server 106*a* or the proxy server, the first consumer device 110*a* may be configured to replace the non-programming media content segments from the stream publishing engine 114 with the ad segments returned from the Ad decisioning server 106 or the proxy server.

Figure 1B:
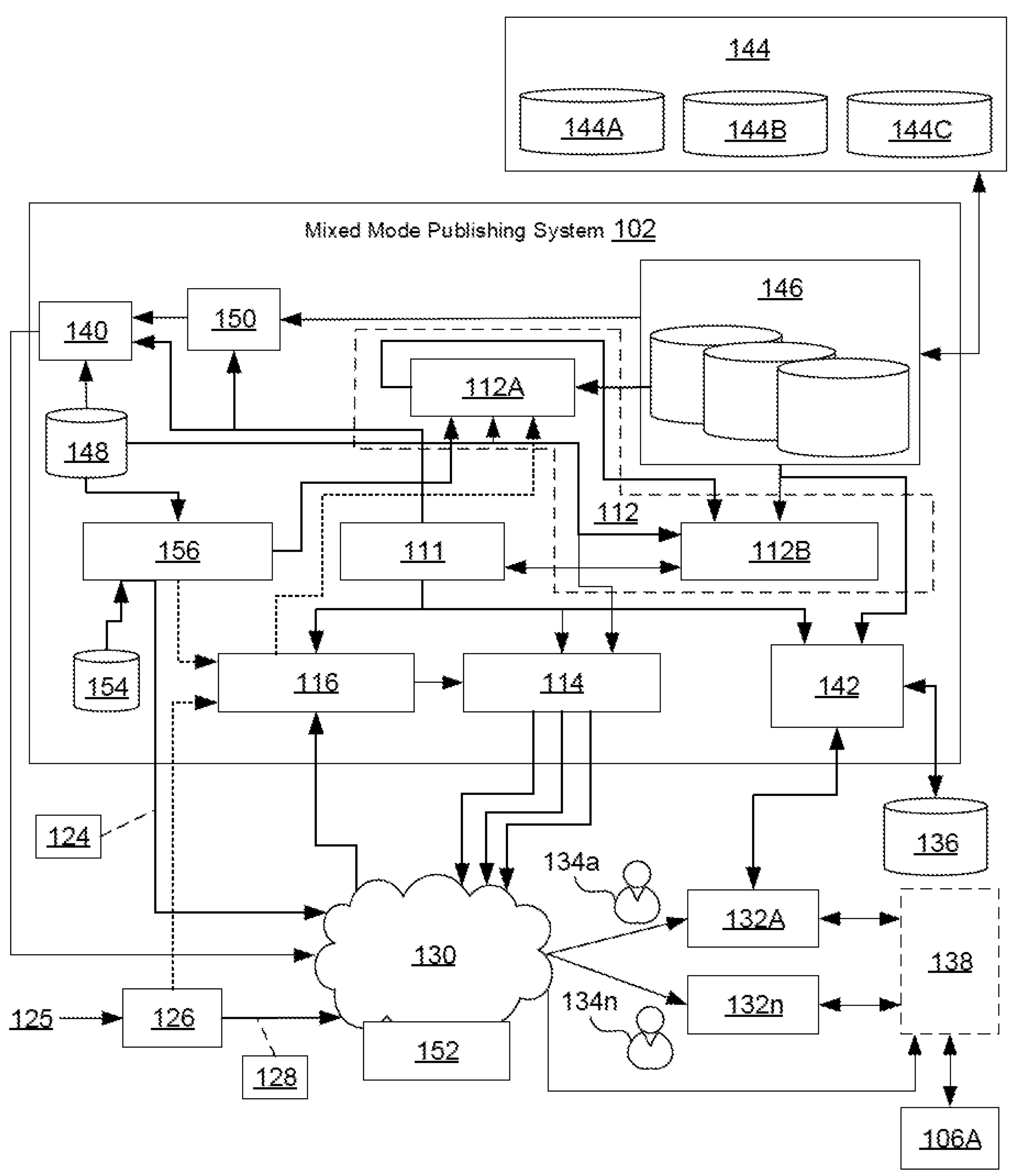
FIG. 1B is a block diagram that illustrates an exemplary mixed mode publishing system for publishing disparate live media output streams in mixed mode, in accordance with an exemplary embodiment of the disclosure.

FIG. 1B is a block diagram that illustrates an exemplary mixed mode publishing system for publishing a disparate live media output stream in mixed mode, in accordance with an exemplary embodiment of the disclosure. Referring to FIG. 1B, the mixed mode publishing system 102, in addition to the Ad decisioning server 106*a*, the schedule manager 112 (including the network scheduler 112A and the switch logic manager 112B), the stream publishing engine 114, and the indexing and storage system 116, comprises additional components. The mixed mode publishing system 102 may further include a programming schedule 111, live feeds 125, live stream encoder/packagers 126, and live input streams 128. There are also shown a content delivery system 130, which is an example of the network 108, client devices 132*a*, . . . , 132*n*, which correspond to the plurality of consumer devices 110*a*, . . . , 110*n*, and users 134*a* and 134*n* associated with the client devices 132*a* and 132*n*. There are further shown a Geo location service 136, a proxy server 138, a program guide service 140, a stream selection service 142, a stream owner/operator 144 (further comprising a preferences database 144A, a requirement database 144B, and a consumer database 144C), a schedules, rights, and preferences database 146, a media content metadata storage system 148, an experience control system 150, a media storage 152, a media content master storage system 154, and a content encoder/packager 156.

In some embodiments of the disclosure, the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media content master storage system 154, and the content encoder/packager 156 may be integrated to form an integrated system. In some embodiments of the disclosure, as shown, the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media content master storage system 154, and the content encoder/packager 156 may be distinct. Other separation and/or combination of the various entities of the exemplary mixed mode publishing system 102 illustrated in FIG. 1B may be done without departing from the spirit and scope of the various embodiments of the disclosure.

The programming schedule 111 may correspond to an instruction set for each disparate live media output stream. The programming schedule 111 may inform the stream publishing engine 114 about pre-encoded media assets and live input streams as well as when and how to switch between the various pre-encoded media assets and live input streams. The programming schedule 111 may also support defining break durations for mid roll ads, break locations, and durations between the pre-encoded media asset and live input stream switches.

The live feeds 125 may correspond to live content segments of one or more media feeds of channels, such as a live feed of a CNN channel. The media feed of a channel may correspond to a live broadcast feed or a live regional feed generated by source devices 118.

The live stream encoder/packagers 126 may comprise suitable logic, circuitry, and interfaces that may be configured to execute code to receive the live feeds 125 from source devices 118. The live stream encoder/packagers 126 may encode and package the live feeds 125 into the live input streams 128, in specific formats ready for delivery to the client devices 132*a*, . . . , 132*n*. Each of the live input streams 128 may comprise plurality of media segments transcoded to a different type of stream for different types of device, such as a TV or a mobile device, and marked with Nielson markers. The live stream encoder/packagers 126 may be configured to generate a plurality of live input stream manifests corresponding to the each of the live input streams 128. Various formats of the plurality of live input stream manifests or playlists, may include, but are not limited to, DASH and HLS. Such live input streams and corresponding live input stream manifests may be transmitted to a content delivery system.

The live input streams 128 may correspond to a format of live media stream that may be transmitted to the content delivery system 130 to be indexed by the indexing and storage system 116 to prepare for media distribution, for example, web distribution. Various media container formats of the live media content may include, but are not limited to, transport stream (TS), fragmented MP4 (fMP4), Common Media Application Format (CMAF) and the like. For each of such live input streams 128, there may exist a live schedule comprising metadata (such as time of start, duration and the like), stored in the live schedules database.

The content delivery system 130 may correspond to the network 108, described in FIG. 1. The content delivery system 130 may comprise networks configured for distributing media content to the plurality of client devices 132*a*, . . . , 132*n*. Generally, the term "content," "metadata," "media," and similar words are used interchangeably to refer to any type of media-audio, videos, datacasts, music, text, images, graphics, articles, photos, photo galleries, video galleries, infographics, maps, polls, guest biographies, tweets or other social media, blog posts, and/or the like. The content delivery system 130 may be configured to provide a plurality of disparate live media output streams to the plurality of client devices 132*a*, . . . , 132*n*, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132*a*, . . . , 132*n* may correspond to consumer devices 110*a*, . . . , 110*n*. In accordance with an embodiment, the client devices 132*a*, . . . , 132*n* may be content recognition (CR)-enabled devices, such as automatic content recognition enabled devices. The client devices 132*a*, . . . , 132*n* may be configured to communicate with the Ad decisioning server 106*a* and/or the proxy server 138, via the content delivery system 130, or a separate communication network. The client devices 132*a* and 132*n* may be associated with users 134*a* and 134*n*, respectively.

The Geo location service 136 may comprise suitable logic, circuitry, and interfaces that may be configured to provide services to the stream selection service 142 for mapping an IP address of a client device to a geolocation. The Geo location service 136 may further test for usage of a virtual private network for enforcing regional blackouts on one or more client devices that do not support natively collecting and providing the geolocation.

The proxy server 138 may comprise suitable logic, circuitry, and interfaces that may be configured to execute code to communicate with the client devices 132*a*, . . . , 132*n*. In accordance with an embodiment, the proxy server 138 may receive requests from the client devices 132*a*, . . . , 132*n* when the client devices 132*a*, . . . , 132*n* generate requests for the Ad decisioning server 106*a* upon encountering, for example, an advertisement break tag or an overlay tag. In such cases, the proxy server 138 may generate requests to the Ad decisioning server 106*a* for the advertisements on behalf of the client devices 132*a*, . . . , 132*n*. In another embodiment, the proxy server 138 may receive the manifest form the content delivery system 130 and may deliver the manifest to the client devices 132*a*, . . . , 132*n* based on one or more client requests. The proxy server 138 may be configured to detect for example break indicators, and call the Ad decisioning server 106*a*, replace the filler media segments in the manifest and then deliver the modified manifest to the client devices 132*a*, . . . , 132*n*. In an embodiment, the proxy server 138 may be used for one or more client devices of the plurality of client devices 132*a*, . . . , 132*n* where the media player is fully controlled by a third party and does not support ad insertion. In such embodiment, ad blocking may be reduced which usually targets communication between the plurality of client devices 132*a*, . . . , 132*n* and the Ad decisioning server 106*a*. Further, the proxy server 138 may replace the pre-encoded placeholder content segments, such as slate content segments, with the advertisement content segments received from the Ad decisioning server 106*a*.

The program guide service 140 may comprise suitable logic, circuitry, and interfaces that may be configured to execute code to provide a time accurate listing of which programming content is currently playing on each of the generated channels and broadcast channels as well as if experiences, like program restart, are available for a program. In accordance with an embodiment, the client devices 132*a*, . . . , 132*n* may call the program guide service 140 to discover what media content is currently playing by the media player and what media content is coming up next. In accordance with an embodiment, the program guide service 140 may be provided with As-Run data for each generated live media output stream to correct any timing discrepancies between an original program schedule and what is actually playing at a given time.

The stream selection service 142 may comprise suitable logic, circuitry, and interfaces that may be configured to provide a client device, for example, the first client device 132*a*, requesting to view a disparate live media output stream with a correct variant of disparate live media output stream, based on the geolocation and identification of the first client device 132*a*, along with data retrieved from the schedules, rights, and preferences databases 146. The stream selection service 142 may further receive a user selection that corresponds to a selection of a user 134*a* associated with the first client device 132*a* to view the recommended/desired disparate live media output stream on the first client device 132*a*. The stream selection service 142 may further store the received selection in the schedules, rights, and preferences databases 146, and also communicates to the switch logic manager 112B and the stream publishing engine 114. The stream selection service 142 acts as an interface between the switch logic manager 112B of the mixed mode publishing system 102 and the plurality of consumer devices 110*a*, . . . , 110*n*, such as the first client device 132*a*.

The stream owner/operator 144 may comprise suitable logic, circuitry, and interfaces that may be configured to provide one or more parameters to the switch logic manager 112B regarding contractual content requirements for specific locations, and historical knowledge of location preferences. The stream owner/operator 144 may further provide data to the switch logic manager 112B about how to handle non-programming content breaks, whether to insert non-programming content between media switches, how the transition between events may be executed, whether a network logo needs to be displayed and, if so, how often. The stream owner/operator 144 may further provide data, such as consumer data (for example, billing Zip code), and special service level tiers. Additionally, the stream owner/operator 144 may further provide content parameters, for example, regarding the types of channels to be generated (theme, genre, title, and the like), the number of advertisement breaks per hour, and duration of such advertisement breaks.

The schedules, rights, and preferences database 146 may comprise suitable logic, circuitry, and interfaces that may be configured to execute code to store content rights, user preferences, regional preferences, live schedules, and regional rights. For example, content rights may store availability and platform rights for live input streams in the programming schedules, such as the programming schedule 111, the user preferences may store individual client viewing preferences, the regional preferences may store regional viewing preferences, the live schedules may store the schedules for all live input streams, and the regional rights may store regional blackout zones for the various sports leagues, for example. The schedules, rights, and preferences database may further store data supplied from the stream owner/operator 144 including requirements, preferences, such as pre-defined location-based viewing preferences, stream transition rules, and any required client data, such as service level and zip code.

The media content metadata storage system 148 may comprise suitable logic, circuitry, and interfaces that may be configured to store media content metadata. The media content metadata may include metadata associated with media content segments stored in the media content master storage system 154. Examples of the media content metadata may include a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, a media content metadata storage system may also store program-specific information (PSI) data as defined by ISO/IEC 13818-1 (MPEG-2), closed captioning data, and subtitles associated with the media content segments stored in the media content master storage system 154. Other forms of metadata may be utilized without departing from the spirit and scope of the various embodiments of the disclosure.

The experience control system 150 may comprise suitable logic, circuitry, and interfaces that may be configured to execute code to implement a system that is based on content rights to allow individual client devices 132*a*, . . . , 132*n* to access the underlying pre-encoded media assets to enable services, such as restating a program from the beginning or moving forward in the programming schedule to a different programming content.

The media storage 152 may be configured to store encoded and packaged pre-encoded media assets (such as pre-encoded media asset 124), pre-encoded media asset manifests, live input streams (such as live input stream 128), and live input stream manifests for web distribution.

The media content master storage system 154 may comprise suitable logic, circuitry, and interfaces that may be configured to store master versions of the media content. The master versions may be used as the source for creating the On-Demand or pre-encoded media assets for clients in the required formats.

The content encoder/packager 156 may comprise suitable logic, circuitry, and interfaces that may be configured to execute code to determine a package that includes media content and associated metadata. The content encoder/packager 156 may be directly coupled to the indexing and storage system 116. Thus, the content encoder/packager 156 encodes and packages the media content into the required on-demand formats for delivery to the client devices 132*a* and 132*n*. The media content may correspond to one or more of the plurality of media segments transcoded to different types of streams for different types of devices, such as a TV or a mobile device, and marked with Nielson markers. Based on such a package, one or more encoded media assets may be dynamically generated for playout to one or more media players communicatively coupled through the content delivery system 130.

The content encoder/packager 156 may be configured to publish the one or more encoded media assets in real-time or near real-time to the content delivery system 130. The content encoder/packager 156 may also be configured to provide near-real time redundancy. The resulting converted output, i.e. one or more encoded media assets, that is generated by the content encoder/packager 156 may be communicated to the indexing and storage system 116 which may be communicatively coupled with the plurality of consumer devices 108*a*, . . . , 108*n*. The content encoder/packager 156 may also support a robust interface (e.g. application data interface (ADI)) that defines the on-demand duration of the individual segments as well as encryption requirements and a service type to link for ad insertion.

In operation, as a pre-requisite, the stream publishing engine 114 may be configured to generate a plurality of disparate live output stream manifests based on one or more live input streams, one or more corresponding live input stream manifests, one or more pre-encoded media assets, one or more corresponding pre-encoded media asset manifests, one or more additional parameters, and/or one or more programming schedules. A disparate live media output stream manifest of a disparate live media output stream may be based on manipulation of a first live input stream manifest or a first pre-encoded media asset manifest.

The format of such disparate live output stream manifests, live input stream manifests, and pre-encoded media asset manifests may correspond to, for example, DASH and HLS. Further, the media container format of the disparate live output streams, live input streams, and pre-encoded media assets may correspond to, for example, TS, fMP4, and CMAF. Such disparate live output stream manifests are received by the client devices 132*a*, . . . , 132*n* to acquire the defined media content. In some embodiments, to provide additional personalization and scale, an intelligent client device may receive a higher-level instruction set from the mixed mode publishing system 102 and perform the manipulation to simulate the disparate live media output stream locally.

In accordance with an embodiment, at the time of one or more events in the disparate live media output stream manifest, such as transition points, possible live event overruns, or when local content is available to replace national content, the network scheduler 112A may be configured to schedule an alternate pre-encoded media asset 124, hereinafter referred to as pre-encoded media asset 124, to be inserted into the disparate live media output stream manifest. The one or more events in the disparate live media output stream manifest may correspond to one or more events in the first pre-encoded media asset manifest or the first live input stream manifest based on the manipulation of which the disparate live media output stream manifest is generated. Alternatively, at the time of one or more events in the disparate live media output stream manifest, such as to cover a scheduled live event or allow for a switch to live breaking news, for example, the network scheduler 112A may be configured to schedule an alternate live input stream 128, hereinafter referred to as live input stream 128, to potentially be inserted into the disparate live media output stream manifest. As stated above, the one or more events in the disparate live media output stream manifest may correspond to one or more events in the first pre-encoded media asset manifest or the first live input stream manifest based on the manipulation of which the disparate live media output stream manifest is generated.

Such pre-encoded media asset 124 may be provided by the content encoder/packager 156. The content encoder/packager 156 may be configured to encode and package media content and corresponding metadata received from the media content master storage system 154 and media content metadata storage system 148, respectively. Once the content encoder/packager 156 has generated pre-encoded media asset 124 for media distribution, the content encoder/packager 156 may be further configured to generate corresponding pre-encoded media asset manifests. The pre-encoded media asset manifests may correspond to data sets that may be utilized by the client device 132*a* to determine which media segments to play and storage locations of such media segments. The content encoder/packager 156 may be configured to provide encoded and packaged media content and corresponding metadata as the pre-encoded media asset 124 and corresponding pre-encoded media asset manifest to the content delivery system 130 or directly to the indexing and storage system 116.

In accordance with an embodiment, the alternative live feeds 125 may be received by the live stream encoder/packager 126. The live stream encoder/packager 126 may be configured to encode and package the alternative live feeds 125 to generate live input streams 128 for media distribution. Once the live stream encoder/packager 126 has generated live input streams 128 for media distribution, the live stream encoder/packager 126 may be further configured to generate corresponding live input stream manifests. The live input stream manifests may correspond to data sets that may be utilized by the first client device 132*a* to determine which media segments to play and storage locations of such media segments. The live stream encoder/packager 126 may be configured to provide encoded and packaged live feeds 125 as the alternative live input streams 128 and corresponding live stream manifests to the content delivery system 130 or directly to the indexing and storage system 116. Various formats of the pre-encoded media asset manifests and live input stream manifests or playlists may include, but are not limited to DASH and HLS.

In accordance with an embodiment, the switch logic manager 112B may be configured to generate one or more alternate programming schedules, such as the programming schedule 111, based on the schedule of the pre-encoded media asset 124 or the live input stream 128, leveraged from the network scheduler 112A. The generation of the programming schedule 111 may be further based on content rights, regional rights and preference databases, user preferences, pre-encoded media asset schedules, the live input stream schedules, stream owner/operator data, and one or more content parameters. The one or more content parameters may correspond to one or more of genre, demographics, geographical location of the first client device 132*a*, a time of viewing, content rights, individual user preferences based on previous selections and consumer account data. The generated programming schedule 111 may be for an output channel of a required number of output channels required to satisfy the various content rights, regional rights and preferences, and user preferences. The generated programming schedule 111 may generate multiple disparate live media output streams from a number of live input streams and pre-encoded media assets by manipulating the corresponding manifests, playlists, or the like, without having to re-process the corresponding media content.

In accordance with a first set of embodiments, the stream publishing engine 114 may be configured to identify the programming schedule 111 and/or the one or more events in the first live input stream manifest associated with first live input stream in the generated disparate live media output stream manifest. Accordingly, the stream publishing engine 114 may be configured to insert at least one of a second live input stream manifest, and/or one of one or more pre-encoded media asset manifests to an alternate disparate live output stream manifest. For example, a consumer may be watching a live stream and then switches to a pre-encoded media asset or another live stream based on the current program ending and the consumers not being allowed to blackout or not wanting to watch the next event (for example, in case the consumer is not a basketball fan).

In this regard, the schedule manager 112 may be configured to automatically schedule multiple disparate live media output streams for a given number of live input streams, alternate pre-encoded media assets, and audience definitions. The stream selection service 142 may be configured to define the number of disparate live media output streams necessary to meet the requirements of the stream owner/operator 144, based on a combination of source streams schedules, alternate pre-encoded media assets, regional content rights, media content rights, regional user preferences, individual user preferences, and individual user service subscription level data. The schedule manager 112 may be configured to generate the an alternate programming schedule 111, which may correspond to an input source (live input streams and pre-encoded media assets) switching schedule for each of the required disparate live media output stream based on a combination of source streams schedules, alternate pre-encoded media asset schedules, regional content rights, media content rights, regional user preferences, individual user preferences, and individual user service subscription level data. The stream owner/operator 144 may be configured to review and simple editing of the programming schedule 111 and final approval workflow prior to publishing the programming schedule 111 and generating the disparate live media output streams. Further, the programming schedule 111 may be configured to be updated and re-published once the programming schedule 111 is published.

The switch logic manager 112B may be configured to detail the transition logic for each switch between various live input streams according to the determination of the best consumer experience by the stream owner/operator 144. In various examples, the transition logic may correspond to switch at a defined scheduled time, define a transition window and switch only after a program end on the first live input stream, define a transition window and switch only after a program start on the new source stream (such as live input stream 128), and define a schedule window and switch only after a program ends on the first live input stream but join the live input stream 128 back in the buffer at the program start so that no media content is missed. The stream publishing engine 114 may be further configured to schedule overlay tags to be inserted into the generated disparate live media output stream, for example a network logo that is not associated with any particular media content.

In accordance with a second set of embodiments, the stream publishing engine 114 may be configured to identify one or more alternate programming schedules and/or one or more events in first pre-encoded media asset manifest associated with the first pre-encoded media asset, and/or one or more events in the second live input stream manifest, defined in one or more alternate programming schedules. Accordingly, the stream publishing engine 114 may be configured to insert at least one of a second pre-encoded media asset manifest and/or one of the one or more live input stream manifests to the alternate disparate live output stream manifest, based on another transition due to identified one or more events. For example, a consumer watching a stream consisting of a pre-encoded media asset or an alternate live stream and then switching to a live stream on the program start. In this case, the consumer is watching NBA clips, or a live pre-game show not streamed on the national channel and then upon start of the NBA game may switch to the live stream of the national channel streaming the NBA game.

In this regard, the schedule manager 112 may be configured to generate a schedule such as the programming schedule 111, for the generated disparate live media output streams including pre-encoded media asset based on, for example, the desired audience segment, theme, content metadata, content rights, and content availability. The schedule manager 112 may be configured to present relevant eligible content given an audience segment, theme, genre, title, series, schedule duration, and the like, based on the content rights and metadata. Media content segments may be segmented based on whether it was already encoded and packaged for on-demand usage, or whether the pre-encoded media asset 124 was already ingested and certified through the indexing and storage system 116 and is available for immediate play out. The schedule manager 112 may be configured to schedule the live input stream 128 as content choice before or after the alternate pre-encoded media asset 124. The schedule manager 112 may be configured to schedule the live input stream 128 as content choice during the pre-encoded media asset generated live input stream schedule, including, but not limited to various criteria. The criteria may correspond to defining a window for when the switch to the live input stream 128 may occur based on a scheduled event or defining a transition to the live input stream 128 on a program start event. The criteria may correspond to defining the first pre-encoded media asset to continue to play until the program start event is indexed. The criteria may correspond to defining the live input stream 128 as an immediate alternate content choice for an entire schedule to provide switching to breaking news, for example, if a program start is signaled on the alternate live input stream 128. In an example, program start may include an ID that may also be used in determining whether a particular stream should switch or not. Switch may occur on program start and ID match, so same stream may be used as alternate content for multiple channels.

In accordance with various examples, the stream publishing engine 114 may be configured to set ad break durations for ad breaks marked within the pre-encoded media asset 124, skip ad breaks marked within the pre-encoded media asset 124, and schedule ad breaks including duration between pre-encoded media asset 124 and another pre-encoded media asset. The stream publishing engine 114 may be configured to set rules for ad breaks for generated channels consisting of short form content. In an example, the stream publishing engine 114 may schedule an ad break after a defined number of short form assets. In another example, the stream publishing engine 114 may schedule an ad break after a minimum number of seconds of media content, as in, no insertion of the ad break within the clip but immediately after the clip completes. The schedule manager 112 may be further configured to read content metadata and schedule tags to be inserted marking credits and overlay opportunities that may not have been inserted when the pre-encoded media asset 124 was initially packaged. The schedule manager 112 may be further configured to generate the programming schedule 111 based on desired audience segment theme, genre, series title stream duration, and the like, as well as preference for ad insertion frequency and duration, overlay tags for network graphics, and the like, received from the stream owner/operator 144. Simple editing of the automated programming schedule 111 and final approval workflow prior to publishing the programming schedule 111, updating and re-publishing the programming schedule 111 once published, and generating the channel may be supported. Further, the schedule manager 112 may be configured to loop a pre-encoded media asset schedule or portion thereof to keep the disparate live media output stream operational while waiting for a start event on the next scheduled live input stream 128.

At one or more events in the manifests of the pre-encoded media asset 124 and/or live input stream 128, the stream publishing engine 114 may be configured to traverse through corresponding program indicators (such as program start and program end), overlay indicators (such as overlay tags), and non-programming content indicators (such as ad tags or break points marking an ad break). The stream publishing engine 114 may be further configured to insert such program indicators, for example program start and program end, and the non-programming content indicators, for example ad tags or break triggers, in the alternate disparate live media output stream based on ad break locations or one or more events (marked or assumed) defined in the pre-encoded media asset and between different pre-encoded media assets, as defined in the programming schedule 111. The stream publishing engine 114 may be further configured to insert pre-encoded place holder segments, such as filler media content segments or slate segments, for the scheduled break duration, at the ad break location in the pre-encoded media asset 124 and potentially in the live input stream 128, in case of burned-in broadcast ads. Such insertion may be further based on the decision of the stream owner/operator 144 to support digital ad insertion. Further, the stream publishing engine 114 may be configured to insert additional information, for example discontinuity tags, in the alternate disparate live media output stream to help the media player transition smoothly between media content from different sources. The stream publishing engine 114 may be further configured to insert overlay indicators, such as overlay triggers and tags, into the disparate live media output stream based on the programming schedule 111, content metadata, or tags in the manifest of the pre-encoded media asset 124 indicating a need for an overlay graphic. In accordance with some embodiments, the stream publishing engine 114 may be configured to insert in-band ad triggers and graphic overlay triggers during the generation of the pre-encoded media asset 124, for example.

In accordance with the first and the second sets of embodiments stated above, an accurate transition between various live input streams and pre-encoded media assets, as detailed in the programming schedule 111, may be required to provide the desired and effective experience. Such transitions may be defined by the stream owner/operator 144. In an example, the stream owner/operator 144 may define switching at the scheduled time per the programming schedule 111. In another example, the stream owner/operator 144 may define a transition window and switch only after a program start message on the disparate live media output stream signaling the transition event has started. For switching to the pre-encoded media asset 124, for example, the media content will start from the beginning, regardless if the program start message was delayed. Thus, the pre-encoded media asset 124 is shown in its entirety. For switching to the live input stream 128, the live input stream 128 may be joined in progress or may be joined back in the content segment (or index) buffer to the most recent program start message in the live input stream 128. In yet another example, the stream owner/operator 144 may define a transition window and switch as soon as receiving a program start message on the first pre-encoded media asset or the first live input stream in the disparate live media output stream. In yet another example, the stream owner/operator 144 may define a transition window and switch only after the end of the first pre-encoded media asset in the disparate live media output stream, but join the live input stream 128, for example, back in the content segment buffer at the program start message so no content is missed.

It may be noted that, based on the rules stated above, targeted switching may be performed between multiple indexed pre-encoded media assets and indexed live input streams to generate the alternate disparate live media output stream that retains the users associated with the client devices 132*a*, . . . , 132*n*. For example, as stated above, the first pre-encoded media asset in the disparate live media output stream may be switched to the pre-encoded media asset 124 or the live input stream 128. Similarly, the first live input stream in the disparate live media output stream may be switched to the pre-encoded media asset 124 or the live input stream 128.

In accordance with an embodiment, the stream publishing engine 114 may be configured to continue execution of the first pre-encoded media asset in the disparate live media output stream, as per the programming schedule 111, while waiting for a program start message on the live input stream 128. For example, the stream publishing engine 114 may continue to play the first pre-encoded media asset, for example news clips, while waiting for indication that an event, such as breaking news, in the live input stream 128 started, and a switch should occur.

In accordance with an embodiment, the stream publishing engine 114 may be configured to look for an event, such as airing ID, in the program start message of a live event, for example, prior to executing the switch. In this regard, the stream publishing engine 114 may enable a single live input stream to be associated with multiple disparate live media output streams that may or may not need to switch based on the airing ID of the live event that started.

In accordance with an embodiment, based on the insertion, the stream publishing engine 114 may be configured to publish the alternate disparate live output stream manifest to the content delivery system 130.

Such alternate disparate live output stream manifest, published to the content delivery system 130, may be joined by a first client device 132*a*, for example. In accordance with an embodiment, the stream selection service 142 may be configured to determine which disparate live media output stream, individual client devices should join, based on a combination of genre or demographic information for the pre-encoded media asset schedules provided by the network scheduler 112A, client Geo location, regional content rights, media content rights, regional user preferences, individual user preferences, and individual user service subscription level. The stream selection service 142 may be configured to present individual client devices 132*a*, . . . , 132*n*, a choice if at a certain switch point there are options for multiple disparate live media output streams, meeting the selection criteria based on the combination of genre or demographic information for the pre-encoded media asset schedules provided by the network scheduler 112A, client Geo location, regional content rights, media content rights, regional user preferences, individual user preferences, and individual user service subscription level data. The stream selection service 142 may be further configured to log the selection of the choice of the individual client devices 132*a*, . . . , 132*n*, in the user preferences database, so that decision may be used in determining the number of disparate live media output streams to be created and the client stream selection in the future.

In accordance with an embodiment, the mixed mode publishing system 102 may enable the individual client devices 132*a*, . . . , 132*n*, to personalize viewing of a disparate live media output stream consisting of pre-encoded media assets by accessing the underlying pre-encoded media assets. For example, a client devices 132*a* may be enabled to link to the underlying pre-encoded media asset based on verified media content rights, if the client devices 132*a* joins the disparate live media output stream with a program in progress and desires to start the program over from the beginning. Further, the first client device 132*a* may be provided a playlist or a disparate live media output stream containing the next episodes to play after the episode selected for program restart completes. Further, the first client device 132*a* may be allowed to move forward in time in the program guide service 140 and play an upcoming program via a link to the underlying pre-encoded media asset. Further, the first client device 132*a* may be provided a playlist or disparate live media output stream containing the next episodes to play after the episode selected to jump ahead to view. Further, the first client device 132*a* may be enabled to download the underlying pre-encoded media asset for offline consumption, based on verified media content rights, in the case the user associated with the first client device 132*a* was not able to finish viewing the program in the disparate live media output stream.

Figure 2:
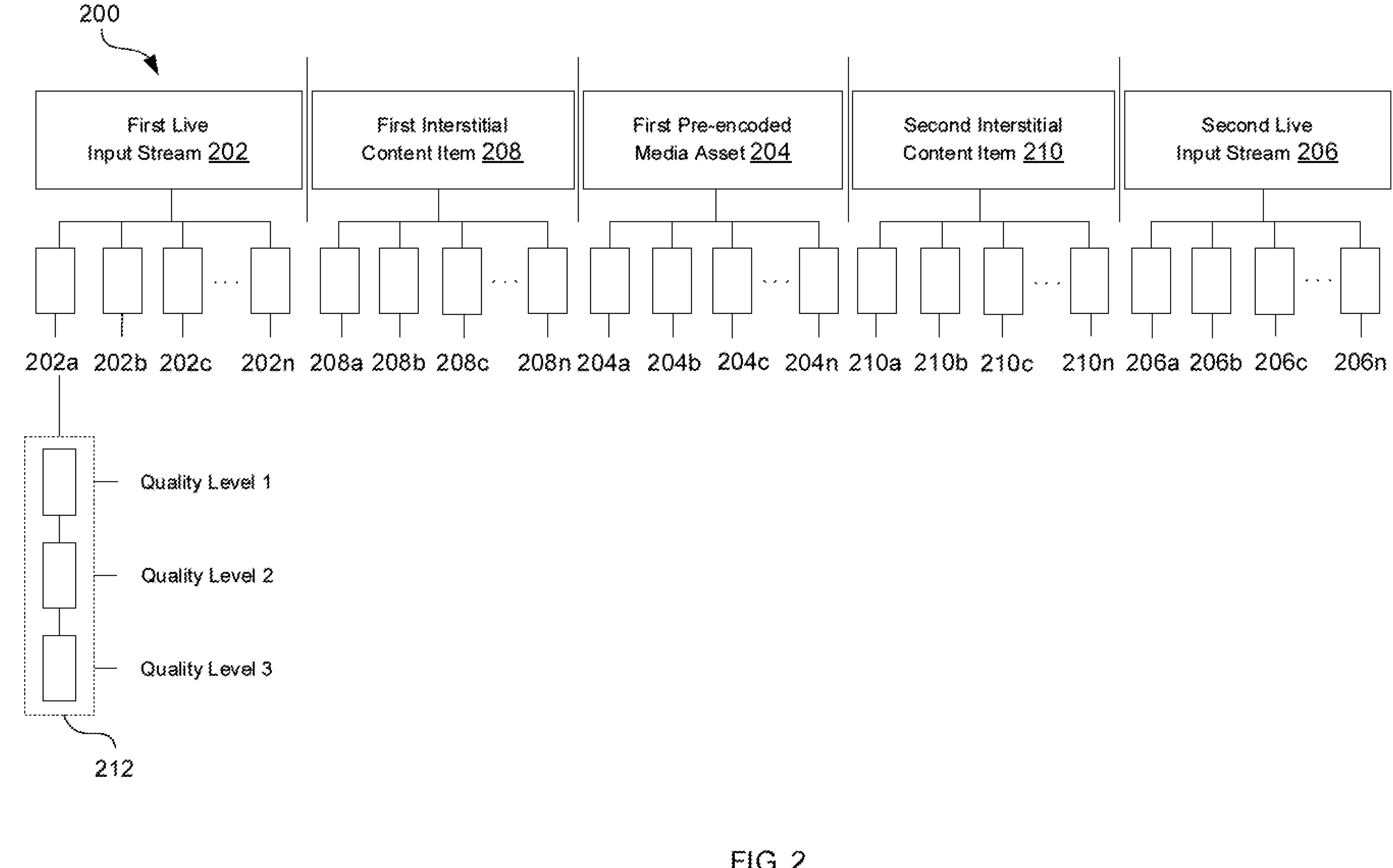
FIG. 2 illustrates segmentation of live input streams and pre-encoded media assets for a programming schedule for publishing disparate live media output streams in mixed mode by the mixed mode publishing system of FIG. 1B, in accordance with an exemplary embodiment of the disclosure.

FIG. 2 illustrates segmentation of live input streams and pre-encoded media assets for the programming schedule 111 for publishing disparate live media output streams in mixed mode by the mixed mode publishing system 102 of FIG. 1B, in accordance with an exemplary embodiment of the disclosure. Referring to the exemplary arrangement of FIG. 2, there is shown a first live input stream 202, a first pre-encoded media asset 204, and a second live input stream 206. There is also shown a first interstitial content item 208 placed after the first live input stream 202, and a second interstitial content item 210 placed after the first pre-encoded media asset 204. The first pre-encoded media asset 204 may be a pre-encoded content item and may be stored in the media content master storage system 154 in segments or other forms. For example, the first live input stream 202 may be segmented into first set of video segments 202*a*, 202*b*, 202*c*, . . . , 202*n*. Similarly, the first pre-encoded media asset 204 and the second live input stream 206 may also be segmented into second set of video segments 204*a*, 204*b*, 204*c*, . . . , 204*n*, and third set of video segments 206*a*, 206*b*, 206*c*, . . . , 206*n* respectively. By way of example, the segmentation of the first live input stream 202 and the second live input stream 206 may be executed by the plurality of live stream encoder/packagers 126*a*, . . . , 126*n*. Further, the segmentation of the first pre-encoded media asset 204 may be executed by the content encoder/packager 156. The encode stage may create various quality levels and the package stage segments the content into the short segments, and produces the correct format, such as TS, fMP4, or CMAF and encrypts the media content to prevent piracy. In accordance with an embodiment, all the segments of the first set of video segments 202*a*, 202*b*, 202*c*, . . . , 202*n*, the second set of video segments 204*a*, 204*b*, 204*c*, . . . , 204*n*, and third set of video segments 206*a*, 206*b*, 206*c*, . . . , 206*n*, may be segmented into consistent length, for example, 10 seconds segments. It may be advantageous to have a consistent and smaller file size of segments to be able to quickly push to the content delivery system 130, and also for quick downloading by a media player at the end-user side, such as on the plurality of consumer devices 110*a*, . . . , 110*n*.

It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the programming schedule 111 may be possible with respect to interstitial content items.

The insertion of the live content segments may be done on-the-fly based on dynamic scheduling and the programming schedule 111 manipulation. The insertion of the live input streams, pre-stored media content, pre-encoded media assets, and/or the like, may be driven by real time or near-real time content context analysis, content rights, user preferences, user-selection on the consumer devices 110*a*, . . . , 110*n*, or driven by external data received from the external data source 120. The stream publishing engine 114, in conjunction with the schedule manager 112 and the stream selection service 142, may be configured to insert live input streams or pre-stored media assets, in an existing disparate live media output stream based on manipulation of a manifest the existing disparate live media output stream, such as an existing channel.

In accordance with an embodiment, each segment of the first set of video segments 202*a*, 202*b*, 202*c*, . . . , 202*n*, the second set of video segments 204*a*, 204*b*, 204*c*, . . . , 204*n*, and third set of video segments 206*a*, 206*b*, 206*c*, . . . , 206*n*, may be further processed to be stored at various quality levels, and content encryption modes for the purposes of adaptive bitrate streaming and Digital Rights Management, for example, the video segment 202*a* may be stored in a plurality of quality levels, for example, high definition (HD), high dynamic range (HDR) video, or different quality levels in accordance with specified pixel resolutions, bitrates, frame rates, and/or sample frequencies. As each of the media content, such as the media content 202 to 206, are encoded, segmented, and stored in the plurality of quality levels in a media content storage system, the media content may be re-used to create new channels, such as new disparate live media output streams, without requiring to re-encode a selected live input stream or a pre-encoded media asset when a new disparate live media output stream is created using the live input streams or a pre-encoded media asset.

For the sake of brevity, and with reference to FIG. 2, there is shown an example of publishing disparate live media output stream in mixed mode using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110*a*, . . . , 110*n*, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3:
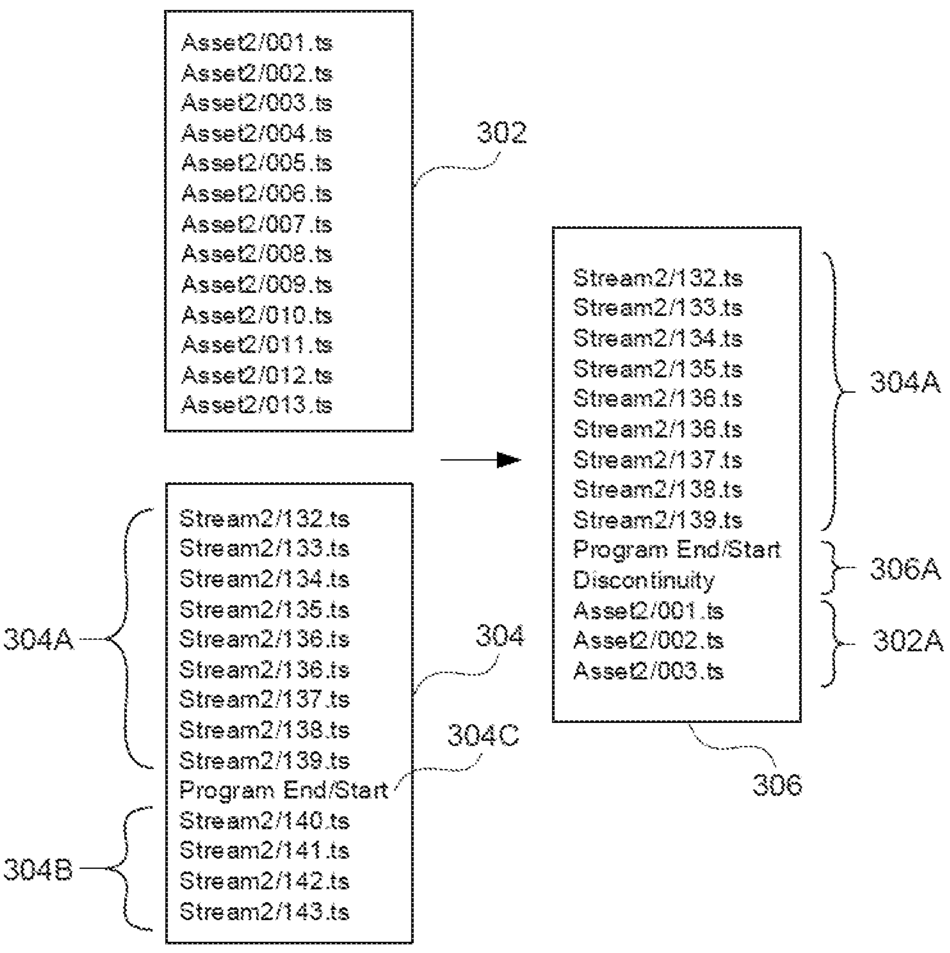
FIG. 3 illustrates a first exemplary scenario associated with publishing a disparate live media output stream in mixed mode using a pre-encoded media asset and a live input stream by the mixed mode publishing system of FIG. 1B, in accordance with an exemplary embodiment of the disclosure.

FIG. 3 illustrates a first exemplary scenario associated with publishing of a disparate live media output stream in mixed mode by the mixed mode publishing system 102 of FIG. 1B, in accordance with an exemplary embodiment of the disclosure. Referring to the exemplary scenario of FIG. 3, there are shown a first pre-encoded media asset manifest 302, a first live input stream manifest 304, and a disparate live media output stream manifest 306.

The first pre-encoded media asset manifest 302 may be pre-encoded On-Demand content item listed in the programming schedule 111. The first live input stream manifest 304 may also be encoded and packaged on-the-fly by the live encoder/packager 126 and listed in the programming schedule 111. The format of the first pre-encoded media asset manifest 302 and the first live input stream manifest 304 may be, for example, DASH, HLS, or other such format. Further, the format of a first pre-encoded media asset and a first live input stream corresponding to the first pre-encoded media asset manifest 302 and the first live input stream manifest 304, respectively, may be TS, fMP4, CMAF, or other such format.

The first pre-encoded media asset manifest 302 is shown to be including a plurality of first media segments 302A. The first live input stream manifest 304 is shown to be including a plurality of second media segments 304A and 304B and a programming indicator, such as program start/end tag 304C.

The stream publishing engine 114 may be configured to insert information related to the plurality of first media segments 302A. The stream publishing engine 114 may be further configured to insert information related to the plurality of second media segments 304A, and one or more events, i.e. program start/end tag 304C, indicated in the first live input stream manifest 304. The stream publishing engine 114 may be configured to insert such information in the disparate live media output stream manifest 306 at defined intervals. Per a programming schedule, the stream publishing engine 114 may be configured to insert the plurality of second media segments 304A followed by additional information 306A, such as, program start/end tag and a discontinuity tag, followed by the plurality of first media segments 302A in the disparate live media output stream manifest 306. The discontinuity tag in the additional information 306A to facilitate an integrated media player of the first client device 132*a* to transition smoothly between media content from different sources, i.e. a live input stream and a pre-encoded media asset. Thereafter, the stream publishing engine 114 may publish the disparate live media output stream manifest 306 in the content delivery system 130.

The client device, such as the first client device 132*a*, receives the manipulated manifest, i.e. the disparate live media output stream manifest 306, from the content delivery system 130, and the integrated media player may read information from the disparate live media output stream manifest 306 to acquire the defined media content. The channel streaming the disparate live media output stream manifest 306 thus created may include a live input stream within which a pre-encoded media asset is inserted at a transition point. The disparate live media output stream manifest 306 may be customized using all available live input streams and pre-encoded media assets. Thus, a low-cost regional channel disparate live media output stream manifest 306 may be created. For example, the disparate live media output stream manifest 306 may include a live input stream transitioned to regional VOD and transitioned back to the live input stream. Placement of such transition points may be determined by the stream publishing engine, based on various criteria, as described in FIG. 1B.

FIGS. 4A to 4F illustrate various second exemplary scenarios associated with playout of disparate live media output streams published in FIG. 3, in accordance with an exemplary embodiment of the disclosure. FIGS. 4A to 4C illustrate three exemplary scenarios for alternating programming, FIGS. 4D and 4E illustrate two exemplary scenarios for mixed mode disparate live media output stream, and FIG. 4F illustrates an exemplary scenario for channel versioning.

Referring to the exemplary scenario 400A, there are shown a disparate live media output stream 402 for original channel, referred to as TNT, and an alternate disparate live media output stream 404 for an alternate channel, referred to as Alt TNT, corresponding to the original channel. The disparate live media output stream 402 and the alternate disparate live media output stream 404 may be scheduled based on a programing schedule generated by the schedule manager 112, described in detail in FIG. 1B. In the exemplary scenario 400A, the disparate live media output stream 402 streams a live input stream, such as a live event, streamed on the original channel. The live event, such as the NBA game starts at, for example at 8:00 pm, and ends in time, for example 10:00 pm. A new program starts at 10:00 pm in the disparate live media output stream 402. The alternate disparate live media output stream 404 for the alternate channel, referred to as Alt TNT, may be scheduled to fill the live event between 8:00 pm to 10:00 pm, in accordance with a scenario that the user is not an NBA fan. Thus, the disparate live media output stream 402 is switched to the alternate disparate live media output stream 404 at 8:00 pm. The Alt TNT is continuously monitored and switched back from the alternate disparate live media output stream 404 to disparate live media output stream 402 at 10:00 pm. At 10:00 pm, new program starts in the disparate live media output stream 402. In such scenario, for example, the mixed mode publishing system 102 is required to be resynched nightly.

Referring to the exemplary scenario 400B, there are shown a disparate live media output stream 406 for original channel, referred to as TNT, and an alternate disparate live media output stream 408 for an alternate channel, referred to as Alt TNT, corresponding to the original channel. The disparate live media output stream 406 and the alternate disparate live media output stream 408 may be scheduled based on a programing schedule generated by the schedule manager 112, described in detail in FIG. 1B. In the exemplary scenario 400B, the disparate live media output stream 406 corresponds to a live input stream, such as a live event, streamed on the original channel. The live event, such as the NBA game starts at, for example at 8:00 pm, and ends late (or overruns), for example 10:30 pm, which is half an hour past the scheduled time, 10:00 pm. Consequently, next show is joined in progress, for example 10:30 pm. And the next show starts at 11:00 pm. The alternate disparate live media output stream 408 for the alternate channel, referred to as Alt TNT, may be scheduled to fill the live event between 8:00 pm to 10:00 pm and then from 10:00 pm to 11:00 pm, in accordance with a scenario that the user is not an NBA fan. Thus, the disparate live media output stream 406 is switched to the alternate disparate live media output stream 408 at 8:00 pm, however, cannot switch back from the alternate disparate live media output stream 408 to disparate live media output stream 406 at 10:00 pm as the NBA match is still being streamed. Thus, the alternate disparate live media output stream 408 further includes originally scheduled program. Thus, the user watches the originally scheduled program till 11:00 pm (thus does not switch to the program to join in progress in the disparate live media output stream 406) and actually, joins back the disparate live media output stream 406 when the new program starts. The Alt TNT is continuously monitored and at 11:00 pm, the alternate disparate live media output stream 408 is switched back to the disparate live media output stream 406 and the users join the new program in the disparate live media output stream 406. In such scenario, for example, the mixed mode publishing system 102 is required to be resynched nightly.

Referring to the exemplary scenario 400C, there are shown a disparate live media output stream 410 for original channel, referred to as TNT, and an alternate disparate live media output stream 412 for an alternate channel, referred to as Alt TNT, corresponding to the original channel. The disparate live media output stream 410 and the alternate disparate live media output stream 412 may be scheduled based on a programing schedule generated by the schedule manager 112, described in detail in FIG. 1B. In the exemplary scenario 400C, the disparate live media output stream 412 corresponds to a live input stream, such as a live event, streamed on the original channel. The live event, such as the NBA game starts at, for example at 8:00 pm, and ends late (or overruns), for example 10:30 pm, which is half an hour past the scheduled time, 10:00 pm. Accordingly, the channel delays the next show to start from 10:30 pm as it may be, for example a big premier and the channel wants maximum audience to join. The alternate disparate live media output stream 412 for the alternate channel, referred to as Alt TNT, may be scheduled to fill the live event between 8:00 pm to 10:00 pm, in accordance with a scenario that the user is not an NBA fan. Thus, the disparate live media output stream 410 is switched to the alternate disparate live media output stream 412 at 8:00 pm. However, the alternate program ends early before 10:00 pm and cannot switch back from the alternate disparate live media output stream 412 to disparate live media output stream 410 before 10:30 pm as the NBA match is still being streamed. Thus, the alternate disparate live media output stream 412 further schedules filler content from the end time of the alternate program till 10:30 pm. Thus, the user watches the filler content till 10:30 pm. The Alt TNT is continuously monitored and the disparate live media output stream 410 is joined back when the new program starts at 10:30 pm. In order to switch precisely at a program start in the disparate live media output stream 410 at 10:30 pm, the streaming of filler content may be cut off, as the channel may not want to be delayed more than 60 seconds, for example, to receive live viewing credit. Thus, the filler content may be scheduled to be having short clips.

Thus, the three exemplary scenarios 400A to 400C for alternate programming illustrated in FIGS. 4A to 4C respectively, provide users (or viewers) a choice when likelihood of audience turnover is high. For example, there is a high likelihood of the users (or viewers) to switch from the broadcasting channel streaming disparate live media output streams, for example 402, 406, and 410. Accordingly, the mixed mode publishing system 102 provides alternate programming in alternate disparate live media output streams, for example 404, 408, and 412, for the duration of the event to retain the users (or viewers). It may be noted that above exemplary scenarios correspond to switching from live input streams to alternate pre-encoded media assets in case the user (or viewer) is not a sports fan. Though not illustrated here, there may be scenarios that may correspond to switching from pre-encoded media assets to live input streams in case the user (or viewer) is a sports fan. For example, when there is a high likelihood of the users (or viewers) to switch from the broadcasting channel streaming linear channel, such as pre-encoded media assets, for example, crime dramas on TNT or comedy show on TBS. Accordingly, the mixed mode publishing system 102 may provide alternate programming in alternate disparate live media output streams streaming live input streams, such as NBA on Alt TNT and E-League on Alt TBS, for the duration of the linear event to retain the users (or viewers). When the live input streams end, alternate disparate live media output streams are switched back to disparate live media output stream.

Referring to the exemplary scenario 400D, there is shown a pre-encoded media asset manifest 414, for example a new and popular clips playlist relating to finance, based on which a disparate live media output stream (not shown) may be generated. There is further shown a live input stream 416, for example a live coverage of earnings and job reports or a live opening and closing bells on Wall Street. The pre-encoded media asset manifest 414 may be switched to a program start of a live event in the live input stream 416 when a clip completes. Thus, the live event is not missed but may be slightly delayed. The live input stream 416 may be continuously monitored for a defined window. The live event in the live input stream 416 may be switched back to the next clip when the live event ends and program end is encountered. Thus, the pre-encoded media asset manifest 414 is resumed when the live event ends.

Referring to the exemplary scenario 400E, there is shown a pre-encoded media asset manifest 418, for example a new and popular clips playlist relating to finance, based on which a disparate live media output stream (not shown) may be generated. There is further shown a live input stream 420, for example a live coverage of earnings and job reports or a live opening and closing bells on Wall Street. The pre-encoded media asset manifest 418 may be switched to a program start of a live event in the live input stream 420 at a segment boundary of a clip being streamed. Such type of switch may be an abrupt switch for an important event not to be missed. The live input stream 420 may be continuously monitored for a defined window. The live event in the live input stream 420 may be switched back to the start of the same clip that was interrupted for switching to the live event. Thus, the pre-encoded media asset manifest 418 is resumed when the live event ends.

Referring to the exemplary scenario 400F, there is shown a first disparate live media output stream manifest 422 corresponding to a channel, for example NBA TV. There is further shown a second disparate live media output stream manifest 424 corresponding to another channel, for example NBA News Feed. There are further shown three disparate live media output stream manifests 426 to 430 generated for three team versions, for example NBA TV Team 1, NBA TV Team 2, and NBA TV Team 3. A first programming schedule for NBA TV Team 1, a second programming schedule for NBA TV Team 2, and a third programming schedule for NBA TV Team 3 may be defined in such a manner that local team content is scheduled in three disparate live media output stream manifests 426 to 430, for example between 3:00 pm to 4:00 pm. It ay so happen that some teams may have more local content than others. In certain cases, the NBA TV Team 1, and NBA TV Team 3, for example, may switch from national program to breaking news, such as trades and press conferences, and back to the national programs. Thus, in such exemplary scenario, an extra control layer may be required to switch only relevant team versions, such as NBA TV Team 1 and NBA TV Team 3 only. For switching to non-scheduled events, on-the-fly decisioning may be performed. Based on the content rights, team versions may be switched to team games, for example.

Figure 5A:
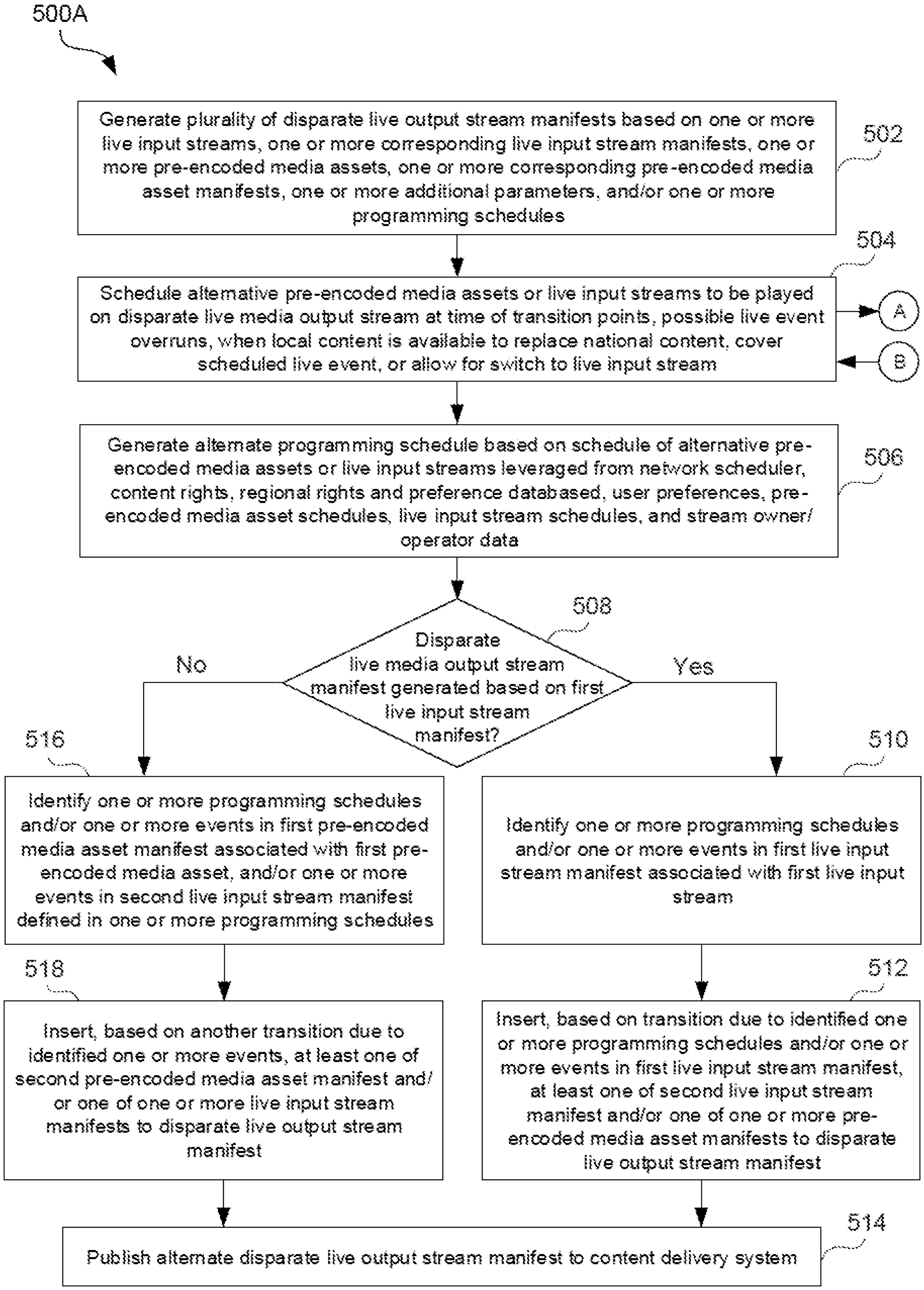
FIGS. 5A and 5B collectively depict a flowchart illustrating exemplary operations for publishing disparate live media output streams in mixed mode in the mixed mode publishing system of FIG. 1B, in accordance with an exemplary embodiment of the disclosure.
Figure 5B:
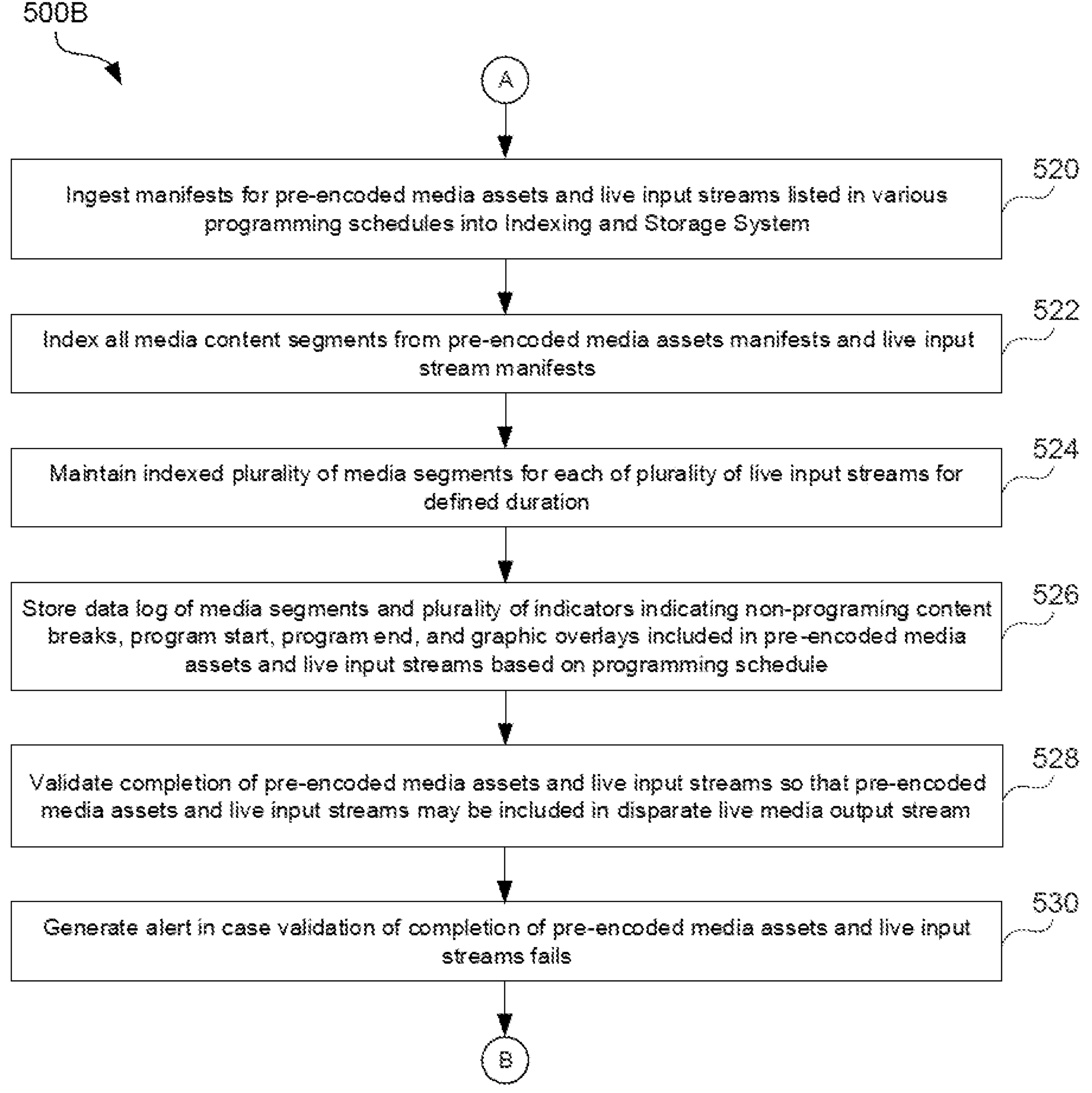

FIGS. 5A and 5B depict a flowchart illustrating exemplary operations for publishing disparate live media output streams in mixed mode in the mixed mode publishing system 102 of FIG. 1B, in accordance with an exemplary embodiment of the disclosure. Referring to FIGS. 5A and 5B, there are shown flowcharts 500A and 500B comprising exemplary operations 502 through 508 and 510 to 522 in flowcharts 500A and 500B, respectively.

At 502, a plurality of disparate live output stream manifests may be generated based on one or more live input streams, one or more corresponding live input stream manifests, one or more pre-encoded media assets, one or more corresponding pre-encoded media asset manifests, one or more additional parameters, and/or one or more programming schedules. In accordance with an embodiment, the stream publishing engine 14 may be configured to generate a plurality of disparate live output stream manifests based on one or more live input streams, one or more corresponding live input stream manifests, one or more pre-encoded media assets, one or more corresponding pre-encoded media asset manifests, one or more additional parameters, and/or one or more programming schedules. In accordance with an embodiment, the stream publishing engine 14 may be configured to generate the plurality of disparate live output stream manifests based on insertion of a plurality of media content segments and one or more indicators in a disparate live output stream manifest. In accordance with another embodiment, the stream publishing engine 14 may be configured to generate the plurality of disparate live output stream manifests based on insertion of a plurality of live input stream manifests and one or more indicators in a disparate live output stream manifest. Accordingly, the disparate live output stream manifest may be published in the content delivery system 130.

At 504, alternate pre-encoded media assets or live input streams to be played on the disparate live media output stream may be scheduled at the time of transition points, possible live event overruns, when local content is available to replace national content, cover a scheduled live event, or allow for a switch to a live input stream. In accordance with an embodiment, the network scheduler 112A may be configured to schedule the alternate pre-encoded media asset 124, hereinafter referred to as pre-encoded media asset 124, to be played on the disparate live media output stream at the time of transition points, possible live event overruns, or when local content is available to replace national content. Alternatively, the network scheduler 112A may be configured to schedule the alternate live input stream 128, hereinafter referred to as live input stream 128, to potentially be inserted into the disparate live media output stream consisting of pre-encoded media assets, such as pre-encoded media asset 124, to cover a scheduled live event or allow for a switch to live breaking news, for example.

Such alternate pre-encoded media asset 124 may be provided by the content encoder/packager 156. The content encoder/packager 156 may be configured to encode and package media content and corresponding metadata received from the media content master storage system 154 and media content metadata storage system 148, respectively. Once the content encoder/packager 156 has generated alternate pre-encoded media asset 124 for media distribution, the content encoder/packager 156 may be further configured to generate corresponding pre-encoded media asset manifests. The pre-encoded media asset manifests may correspond to data sets that may be utilized by the first client device 132*a* to determine which media segments to play and storage locations of such media segments. The content encoder/packager 156 may be configured to provide encoded and packaged media content and corresponding metadata as the pre-encoded media asset 124 and corresponding pre-encoded media asset manifest to the content delivery system 130 or directly to the indexing and storage system 116.

In accordance with an embodiment, the alternative live feeds 125 may be received by the live stream encoder/packager 126. The live stream encoder/packager 126 may be configured to encode and package the alternative live feeds 125 to generate live input streams 128 for media distribution. Once the live stream encoder/packager 126 has generated live input streams 128 for media distribution, the live stream encoder/packager 126 may be further configured to generate corresponding live input stream manifests. The live input stream manifests may correspond to data sets that may be utilized by the first client device 132*a* to determine which media segments to play and storage locations of such media segments. The live stream encoder/packager 126 may be configured to provide encoded and packaged live feeds 125 as the alternative live input streams 128 and corresponding live stream manifests to the content delivery system 130 or directly to the indexing and storage system 116. Various formats of the pre-encoded media asset manifests and live input stream manifests or playlists may include, but are not limited to, DASH and HLS. Control passes to 520 in FIG. 5B.

At 520, manifests for pre-encoded media asset 124 and live input stream 128, listed in the various programming schedules, may be ingested into the indexing and storage system 116. In accordance with an embodiment, the content encoder/packager 156 and the live stream encode/packager 126 may be configured to ingest the pre-encoded media asset manifests and live input stream manifests, respectively, enlisted in the programming schedule 111, into the indexing and storage system 116. In accordance with an embodiment, a proprietary manifest format may be implemented between the content encoder/packager 156, the live stream encode/packager 126, and the indexing and storage system 116 in case additional information is required to be communicated to the indexing and storage system 116, which is not traditionally communicated in a published manifest.

At 522, all media content segments from pre-encoded media asset manifests and live input stream manifests may be indexed. In accordance with an embodiment, the indexing and storage system 116 may be configured to index the plurality of media segments and indicators from the pre-encoded media asset manifests and live input stream manifests. In accordance with an embodiment, the plurality of media segments may be generated based on encoding and packaging status of the live input streams, such as the live input stream 128, ingestion status of the live input streams, such as the live input stream 128, into the indexing and storage system 116, and availability of the live input streams for immediate playout.

At 524, the indexed plurality of media segments for each of the pre-encoded media asset manifests and live input stream manifests may be maintained for a defined duration. In accordance with an embodiment, the indexing and storage system 116 may be configured to maintain the indexed plurality of media segments for each of the pre-encoded media asset manifests and live input stream manifests for a defined duration.

At 526, a data log of media segments and a plurality of indicators indicating non-programing content breaks, program start, program end, and graphic overlays included in the pre-encoded media assets, such as pre-encoded media asset 124, and live input streams based on programming schedule, may be stored. In accordance with an embodiment, the indexing and storage system 116 may be configured to store data log of media segments and plurality of indicators indicating non-programing content breaks, program start, program end, and graphic overlays included in the pre-encoded media assets, such as pre-encoded media asset 124, and live input streams, such as the live input stream 128, based on programming schedule 111.

At 528, completion of pre-encoded media assets, such as pre-encoded media asset 124, and live input streams, such as the live input stream 128, may be validated so that pre-encoded media assets, such as pre-encoded media asset 124, and live input streams, such as the live input stream 128, may be included in the disparate live media output stream. In accordance with an embodiment, the indexing and storage system 116 may be configured to validate completion of pre-encoded media assets, such as pre-encoded media asset 124, and live input streams, such as the live input stream 128, so that pre-encoded media assets, such as pre-encoded media asset 124, and live input streams, such as the live input stream 128, may be included in the disparate live media output stream.

At 530, an alert may be generated in case the validation of completion of pre-encoded media assets, such as pre-encoded media asset 124, and live input streams, such as the live input stream 128, fails. In accordance with an embodiment, the indexing and storage system 116 may be configured to generate alert in case the validation of the completion of the pre-encoded media assets, such as pre-encoded media asset 124, and the live input streams, such as the live input stream 128, fails. In such case, the indexing and storage system 116 may be configured to execute a corrective action before a scheduled switch time indicated in the programming schedule 111.

In this regard, the indexing of information of the pre-encoded media assets, such as pre-encoded media asset 124, and the live input streams, such as the live input stream 128, enlisted in the programming schedule 111 may include logging of all the media segments contained in the pre-encoded media asset manifests, the live input stream manifests (or playlists), and the plurality of indicators (for example all the tags or other markers indicating non-programming content indicators, program indicators, overlay indicators, credit locations, and the like) in the pre-encoded media assets, such as pre-encoded media asset 124, and the live input streams, such as the live input stream 128. The indexing and storage system 116 may be configured to continuously index the media segments from each of the live input stream manifests associated with the live input streams, such as the live input stream 128, based on the interval on which the live input streams, such as the live input stream 128, are updated. The indexing and storage system 116 may be configured to maintain a buffer of content segment and tags for each of the live input streams, such as the live input stream 128, and the plurality of indicators for each of the live input streams, such as the live input stream 128. Thus, any live input stream may be enabled to be joined back in the buffer at a program boundary (not at a live point) and also enabling program restart, if allowed based on content rights. The indexing and storage system 116 may support multiple manifest formats, that may include, but are not limited to HLS, DASH, and potentially a proprietary format in case information, not contained in a public format, is required to be communicated. Control returns to 504 in FIG. 5A.

At 506, the alternate programming schedule 111 may be generated based on a schedule of alternate pre-encoded media assets, such as pre-encoded media asset 124, or live input streams, such as the live input stream 128, leveraged from the network scheduler 112A, content rights, regional rights and preference databased, user preferences, pre-encoded media asset schedules, the live input stream schedules, and stream owner/operator data. In accordance with an embodiment, the switch logic manager 112B may be configured to generate one or more programming schedules, such as the programming schedule 111, based on the schedule of alternate pre-encoded media assets, such as pre-encoded media asset 124, or live input streams, such as the live input stream 128, leveraged from the network scheduler 112A, content rights, regional rights and preference databased, user preferences, pre-encoded media asset schedules, the live input stream schedules, stream owner/operator data, and one or more content parameters. The one or more content parameters may correspond to one or more of genre, demographics, geographical location of the first client device 132*a*, a time of viewing, content rights, individual user preferences based on previous selections and consumer account data. The generated programming schedule 111 may be for an output channel of a required number of output channels required to satisfy the various content rights, regional rights and preferences, and user preferences.

The stream owner/operator data may define how to handle transitions between live input streams, such as the live input stream 128, and the disparate live media output stream based on one or more criteria. The one or more criteria may include switching between live input streams, such as the live input stream 128, and pre-encoded media assets, such as pre-encoded media asset 124, at scheduled timestamps, and defining a first transition window and switching only after a program start message on the current disparate media output stream signaling the beginning of transition program (if the current disparate media output stream leverages pre-encoded media assets, it should start from the beginning regardless of if the program start message was delayed). The one or more criteria may further include defining a second transition window and switching as soon as receiving a program start message on the destination stream. The one or more criteria may include defining a third transition window and switching only after the end of the current pre-encoded media asset, but join the desired live input stream back in the content buffer at the program start message, so no media content is missed.

In accordance with an embodiment, the data provided by the stream owner/operator 144 may indicate one or more transitions between the pre-encoded media asset 124, live input streams 128 and the first disparate live media output stream. The stream owner/operator 144 may be configured to provide historical knowledge of location preferences from preferences database 144A, parameters regarding contractual content requirements for specific locations from requirement database 144B, and consumer data from the consumer database 144C. The requirement database 144B may include information related to, for example, how to handle non-programming content breaks (such as letting linear non-programming content play-through or pre-encoded place holder content segment, and mark non-programming content for replacement). The requirement database 144B may further include information that may indicate or specify, for example, whether to insert non-programming content between switches, how the transition between events should be executed, and/or whether a network logo needs to be displayed and if so how often, and the like. The consumer database 144C may include information related to, for example, billing Zip code, and special service level tiers.

In this regard, the stream owner/operator 144 may define how to handle transitions between the pre-encoded media asset 124, the live input streams 128 and the first disparate live media output stream, by switching at the scheduled time. In accordance with an embodiment, the stream owner/operator 144 may be configured to provide support for review and editing of the programming schedule 111. Accordingly, the stream owner/operator 144 may provide final approval workflow prior to publish of the programming schedule 111 and generation of a plurality of disparate live media output streams. In accordance with another embodiment, the stream owner/operator 144 may be configured to provide support for update and re-publish of the programming schedule 111 once the programming schedule 111 is published.

In accordance with an embodiment, programming schedule 111 may also define a plurality of indicators (for example, non-programing content indicators, program indicators, and overlay indicators) indicating non-programing content breaks, program start, program end, and graphic overlays to be included in the pre-encoded media asset 124 and/or the live input stream 128 when the plurality of disparate live media output streams are generated. In accordance with an embodiment, the plurality of indicators may also include overlay tags, for example a network logo, to be inserted into the plurality of disparate live media output streams that may not be associated with corresponding media content. Such generated programming schedule 111 may be provided various other systems, such as the indexing and storage system 116, the stream publishing engine 114, the stream selection service 142, and the program guide service 140.

At 508, it may be determined whether the generated disparate live media output stream manifest is based on a first live input stream manifest. In accordance with an embodiment, the generated disparate live media output stream manifest is based on the first live input stream manifest, and the control passes to 510. In accordance with another embodiment, the generated disparate live media output stream manifest is based on a pre-encoded media asset manifest, and the control passes to 516.

At 510, one or more alternate programming schedules and/or one or more events in first live input stream manifest associated with first live input stream may be identified. In accordance with an embodiment, the stream publishing engine 114 may be configured to identify the alternate programming schedule 111 and/or the one or more events in the first live input stream manifest associated with first live input stream in the generated disparate live media output stream manifest.

At 512, based on a transition due to the identified one or more alternate programming schedules and/or one or more events in first live input stream manifest, at least one of a second live input stream manifest and/or one of one or more pre-encoded media asset manifest may be inserted to the alternate disparate live output stream manifest. In accordance with an embodiment, the stream publishing engine 114 may be configured to insert at least one of a second live input stream manifest, and/or one of one or more pre-encoded media asset manifests to an alternate disparate live output stream manifest. An example of the second live input stream manifest may correspond a live input stream manifest associated with the live input stream 128. An example of the one of one or more pre-encoded media asset manifests may correspond a pre-encoded media asset manifest associated with the pre-encoded media asset 124.

In this regard, the mixed mode publishing system 102 may be configured to switch between available indexed pre-encoded media assets and indexed live input streams to generate alternate disparate stream media output, that includes switching from the first live input stream manifest to the second live input stream manifest or switching from the first live input stream manifest to one of one or more pre-encoded media asset manifest.

At 514, alternate disparate live output stream manifest may be published to the content delivery system 130. In accordance with an embodiment, the stream publishing engine 114 may be configured to publish the alternate disparate live output stream manifest to the content delivery system 130.

At 516, one or more alternate programming schedules and/or one or more events in first pre-encoded media asset manifest associated with the first pre-encoded media asset, and/or one or more events in the second live input stream manifest, defined in one or more alternate programming schedules, may be identified. In accordance with an embodiment, the stream publishing engine 114 may be configured to identify one or more alternate programming schedules and/or one or more events in first pre-encoded media asset manifest associated with the first pre-encoded media asset, and/or one or more events in the second live input stream manifest, defined in one or more alternate programming schedules.

At 518, based on another transition due to identified one or more events, at least one of a second pre-encoded media asset manifest and/or one of the one or more live input stream manifests may be inserted to the alternate disparate live output stream manifest. In accordance with an embodiment, the stream publishing engine 114 may be configured to insert at least one of a second pre-encoded media asset manifest and/or one of the one or more live input stream manifests to the alternate disparate live output stream manifest, based on another transition due to identified one or more events.

In this regard, the mixed mode publishing system 102 may be configured to switch between available indexed pre-encoded media assets and indexed live input streams to generate the alternate disparate stream media output, that includes switching from the first pre-encoded media asset manifest to the second pre-encoded media asset manifest or switching from the first pre-encoded media asset manifest to one of one or more live input stream manifest. Control passes to 514.

The stream publishing engine 114 may be configured to generate and publish new disparate live media output streams and alternatives of existing disparate live media output streams with very low investment. Such new disparate live media output streams and alternatives of existing disparate live media output streams may provide the client devices 132*a*, . . . , 132*n* with more target content choices than traditional national or regional broadcast networks.

In accordance with an embodiment, the new or alternative disparate live media output streams, generated by the stream publishing engine 114, may enable branching of a network at audience transition points. In an example, the non-sports fans may be provided with an alternative when a sporting event begins. In another example, the fans tuning in a little earlier may be provided with an option to watch a sporting event sports highlights, pre-game, and the like, instead of forcing them to watch the last few minutes of the previous program. In yet another example, in case an event runs long, users (such as viewers) may be enabled to tune in to watch the next schedule program in its entirety the opportunity to do so, instead of forcing them to watch the end of the event and join their program in progress.

In accordance with an embodiment, t the new or alternative disparate live media output streams, generated by the stream publishing engine 114, may provide various options when programming content is pre-empted. For example, users (such as viewers) may be provided with an option to watch an originally scheduled program when it is pre-empted on the national network for breaking news.

In accordance with another embodiment, the new or alternative disparate live media output streams, generated by the stream publishing engine 114, may provide live input streams in niche generated channels. For example, the stream publishing engine 114 may enable live breaking news to be inserted into a channel that is a series of clips of news headline. In another example, the stream publishing engine 114 may enable a live earning report, jobs report, closing bell recap, and the like in a channel that is a series of financial news story clips.

In accordance with another embodiment, the new or alternative disparate live media output streams, generated by the stream publishing engine 114, may provide content localization. For example, the stream publishing engine 114 may provide localized versions of a live national network by enabling pre-produced local content to replace national programming at certain times. In another example, the stream publishing engine 114 may enable relevant live local breaking news to be switched into the localized version of national network.

Figure 6:
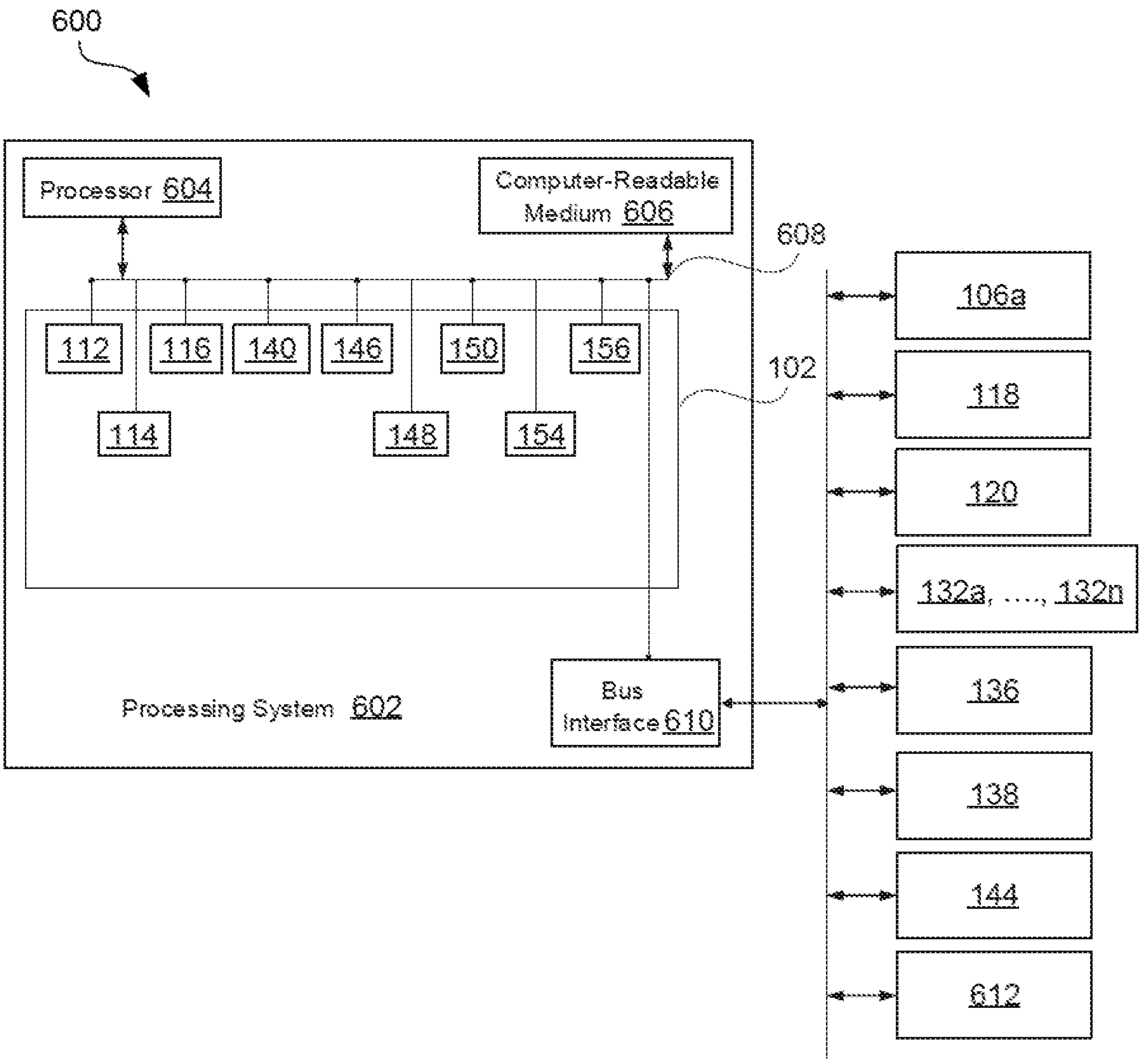
FIG. 6 is a conceptual diagram illustrating an example of a hardware implementation for a mixed mode publishing system employing a processing system for publishing disparate live media output streams in mixed mode, in accordance with an exemplary embodiment of the disclosure.

FIG. 6 is a conceptual diagram illustrating an example of a hardware implementation for a mixed mode publishing system 102 employing a processing system for publishing a disparate live media output stream in mixed mode, in accordance with an exemplary embodiment of the disclosure. Referring to FIG. 6, the hardware implementation shown by a representation 600 for the mixed mode publishing system 102 employs a processing system 602 for publishing a disparate live media output stream using the pre-encoded media assets 124 and live input streams 128, in accordance with an exemplary embodiment of the disclosure, as described herein.

In some examples, the processing system 602 may comprise one or more hardware processors 604, a non-transitory computer-readable medium 606, a bus 608, a bus interface 610, and a transceiver 612. FIG. 6 further illustrates the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media content master storage system 154, and the content encoder/packager 156, as described in detail in FIGS. 1A and 1B. FIG. 6 further illustrates the Ad decisioning server 106*a*, the client devices 132*a*, . . . , 132*n*, the Geo location service 136, the proxy server 138, the stream owner/operator 144, and the media storage 152 as described in detail in FIGS. 1A and 1B.

The hardware processor 604 may be configured to manage the bus 608 and general processing, including the execution of a set of instructions stored on the non-transitory computer-readable medium 606. The set of instructions, when executed by the hardware processor 604, causes the mixed mode publishing system 102 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the hardware processor 604 when executing the set of instructions. The data is stored for short periods or in the presence of power. The non-transitory computer-readable medium 606 may also be configured to store data for one or more of the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, and the content encoder/packager 156.

The bus 608 is configured to link together various circuits. In this example, the mixed mode publishing system 102 employing the processing system 602 and the non-transitory computer-readable medium 606 may be implemented with bus architecture, represented generally by bus 608. The bus 608 may include any number of interconnecting buses and bridges depending on the specific implementation of the mixed mode publishing system 102 and the overall design constraints. The bus interface 610 may be configured to provide an interface between the bus 608 and other circuits, such as, transceiver 612, and external devices, such as source device 118, external data source 120, and client devices 132$a$, . . . , 132$n$.

The transceiver 612 may be configured to provide a communication of the mixed mode publishing system 102 with various other apparatus, such as the Ad decisioning servers 106$a$, . . . , 106$n$, the consumer devices 110$a$, . . . , 110$n$, such as the client devices 132$a$, . . . , 132$n$, the external data source 120, and the source device 118, via the network 108. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VOIP), and/or Wi-MAX.

It should be recognized that, in some embodiments of the disclosure, one or more components of FIG. 6 may include software whose corresponding code may be executed by at least one processor, for across multiple processing environments. For example, the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, and the content encoder/packager 156 may include software that may be executed across a single or multiple processing environments.

In an aspect of the disclosure, the hardware processor 604, the non-transitory computer-readable medium 606, or a combination of both may be configured or otherwise specially programmed to execute the operations or functionality of the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, and the content encoder/packager 156, or various other components described herein, as described with respect to FIGS. 1A to 5B.

Various embodiments of the disclosure comprise the mixed mode publishing system 102 that may be configured to generate a plurality of disparate live media output streams to be viewed on a plurality of consumer devices (such as the consumer devices 110$a$, . . . , 110$n$). The mixed mode publishing system 102 may comprise, for example, the schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, and the content encoder/packager 156. One or more processors in the stream publishing engine 114 may be configured to generate a plurality of disparate live output stream manifests based on one or more live input streams, one or more corresponding live input stream manifests, one or more pre-encoded media assets, one or more corresponding pre-encoded media asset manifests, one or more additional parameters, and/or one or more programming schedules. In an instance in which a disparate live media output stream manifest is generated based on a first live input stream, the stream publishing engine 114 may identify the one or more programming schedules and/or one or more events in a first live input stream manifest associated with the first live input stream. The stream publishing engine 114 may insert, based on a transition due to the identified one or more programming schedules and/or one or more events in the first live input stream manifest, at least one of a second live input stream manifest and/or one of the one or more pre-encoded media asset manifests to the disparate live output stream manifest. The stream publishing engine 114 may further publish the disparate live output stream manifest to a content delivery system 130. In an instance in which the disparate live media output stream manifest is generated based on a first pre-encoded media asset the stream publishing engine 114 may identify the one or more programming schedules and/or the one or more events in a first pre-encoded media asset manifest associated with the first pre-encoded media asset, and/or one or more events in the second live input stream manifest defined in the one or more programming schedules. The stream publishing engine 114 may insert, based on another transition due to the identified one or more events, at least one of a second pre-encoded media asset manifest and/or the one of the one or more live input stream manifests to the disparate live output stream manifest. The stream publishing engine 114 may publish the disparate live output stream manifest to the content delivery system 130.

In accordance with an embodiment, the disparate live output stream manifest may correspond to a programming schedule, for example the programming schedule 111, based on which the one or more live input streams and the one or more pre-encoded media assets are transmitted on the disparate live media output stream. The first live input stream manifest and the first pre-encoded media asset manifest may comprise an index of media segments which are transmitted on the disparate live output stream manifest. The one or more additional parameters may comprise information that pertains to preferred content, demographic data, geographic location of consumer, and rights associated with the one or more live input streams, or the one or more pre-encoded media assets.

In accordance with various embodiments, the one or more events may correspond to a detection of a program end message in the first live input stream manifest or the first pre-encoded media asset manifest. The one or more events may further correspond to a detection of a program start message in at least one of the second live input stream manifest or the one of the one or more pre-encoded media asset manifests. The one or more events may further correspond to a non-programming content indicator, a programming content indicator, or an overlay indicator in a plurality of live input stream manifests. In accordance with an embodiment, the one or more events may correspond to transition points that correspond to time stamps where a consumer device views one pre-encoded media asset or live input stream and switches to a different pre-encoded media asset or a different live input stream.

In accordance with an embodiment, in an instance in which a program end message is detected in the first live input stream manifest or one or more pre-encoded media asset manifests, the stream publishing engine 114 may determine whether a program start message is detected in the second live input stream manifest or the one of the one or more pre-encoded media asset manifests. In an instance in which the program start message is detected, the stream publishing engine 114 may insert at least one of the second live input stream manifest and/or one of the one or more pre-encoded media asset manifests into the disparate live output stream manifest. In an instance in which the program start message is not detected, the stream publishing engine 114 may insert filler content to the disparate live output stream manifest until the program start message is detected.

In accordance with an embodiment, in the instance in which the program start message is detected in the second live input stream manifest or the one of the one or more pre-encoded media asset manifests, the indexing and storage system 116 may be configured to index media segments corresponding to the second live input stream or one of the one or more pre-encoded media assets until a program end message is detected in the first live input stream manifest. Accordingly, the stream publishing engine 114 may insert the second live input stream manifest or the one of the one or more pre-encoded media asset manifest from a location of the program start message into the disparate live output stream manifest such that the indexed media segments corresponding to the second live input stream or the one of the one or more pre-encoded media assets are streamed on the disparate live media output stream. The first live input stream manifest and the first pre-encoded media asset manifest may comprise program overlay and non-programming content indicators.

In accordance with an embodiment, each of the plurality of disparate live stream outputs may have an associated profile corresponding to at least a resolution, digital rights management, or bitrate of corresponding disparate live media output stream. In accordance with an embodiment, the stream publishing engine 114 may be configured to modify the first live input stream manifest or pre-encoded media asset manifest that causes retransmission of one or more media segments of the first live input stream or one or more segments of the first pre-encoded media asset on the disparate live media output stream until the transition is identified. In accordance with an embodiment, the indexing and storage system 116 may be configured to ingest the one or more live input stream manifests and the one or more pre-encoded media asset manifests. The indexing and storage system 116 may be configured to index the one or more live input stream manifests, the one or more pre-encoded media asset manifests, and one or more indicators in each of the one or more live input stream manifests and the one or more pre-encoded media asset manifests.

Various embodiments of the disclosure may provide a non-transitory computer-readable medium, such as the non-transitory computer-readable medium 606, having stored thereon, computer implemented instruction that when executed by the hardware processor 604 causes the mixed mode publishing system 102 to execute operations to generate a plurality of disparate live output stream manifests based on one or more live input streams, one or more corresponding live input stream manifests, one or more pre-encoded media assets, one or more corresponding pre-encoded media asset manifests, one or more additional parameters, and/or one or more programming schedules. In an instance in which a disparate live media output stream manifest is generated based on a first live input stream, the hardware processor 604 further causes the mixed mode publishing system 102 to execute operations to identify the one or more programming schedules and/or one or more events in a first live input stream manifest associated with the first live input stream. The hardware processor 604 further causes the mixed mode publishing system 102 to execute operations to insert, based on a transition due to the identified one or more programming schedules and/or one or more events in the first live input stream manifest, at least one of a second live input stream manifest and/or one of the one or more pre-encoded media asset manifests to the disparate live output stream manifest. The hardware processor 604 further causes the mixed mode publishing system 102 to execute operations to publish the disparate live output stream manifest to a content delivery system 130. In an instance in which the disparate live media output stream manifest is generated based on a first pre-encoded media asset, the hardware processor 604 further causes the mixed mode publishing system 102 to execute operations to identify the one or more programming schedules and/or the one or more events in a first pre-encoded media asset manifest associated with the first pre-encoded media asset, and/or one or more events in the second live input stream manifest defined in the one or more programming schedules. The hardware processor 604 further causes the mixed mode publishing system 102 to execute operations to insert, based on another transition due to the identified one or more events, at least one of a second pre-encoded media asset manifest and/or the one of the one or more live input stream manifests to the disparate live output stream manifest. The hardware processor 604 further causes the mixed mode publishing system 102 to execute operations to publish the disparate live output stream manifest to the content delivery system 130.

Currently, with many broadcast entertainment networks, programming schedules create transition points between different audience segments. For example, at a first channel, programming may transition from a crime drama, such as Major Crimes, to an NBA game. The NBA game appeals to a completely different audience segment than the one watching Major Crimes. The audience turnover at these transition points creates a desire to be able to branch the network to maximize retention of the existing audience segment while simultaneously acquiring a new audience segment to watch the NBA game. Also, when live events run past their scheduled time, the next scheduled program is often joined in progress. Users tuning in to watch the next scheduled program are instead forced to watch the end of the live event and miss the beginning of their program. Further, dedicated encoders, such as physical encoders, are used to encode each program stream before distribution or transmission (for example, before a distribution of a program stream of a channel). Such dedicated encoders are not only costly but also limit ability of a broadcast provider to swap or change content dynamically in a program stream as each content item needs to pass through such dedicated encoders for transmission. In this regard, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time.

To address the above problems, in accordance with the various embodiments of the present disclosure, the mixed mode publishing system 102 may be configured to analyze audience turnover at transition points created by the programming schedule 111 for different audience segments. Based on the analysis, the mixed mode publishing system 102 may branch the broadcast network to maximize retention of the existing audience segment while simultaneously acquiring a new audience segment to watch a specific program, such as the NBA game. Thus, the mixed mode publishing system 102 provides enhanced and intelligent viewer experience with increased appeal in order to retain and gain a wider audience.

Such branching of broadcast networks may provide an option to users, not interested in a live event, to watch the originally scheduled program in its entirety. Thus, the user tuning in to watch the next scheduled program may not be forced to watch the end of the live event and miss the beginning of their program. This alleviates the scenario when live events run past their scheduled time, and the next scheduled program is often joined in progress.

Further, the mixed mode publishing system 102 may be configured to dynamically schedule and manipulate manifest of a live input streams and pre-encoded media assets. Programming and non-programming content in the existing live input streams and pre-encoded media assets streamed on a channel are inserted into a disparate live media output stream manifest to be directly delivered over a web distribution system (such as one or more delivery methods) to be viewed on one or more consumer devices 110a, . . . , 110n. The disparate live media output stream in which the new media item is inserted may not be required to pass through the dedicated encoders before delivery over the network 108, such as the content delivery system 130.

The schedule manager 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, and the content encoder/packager 156 in conjunction with each other, provide significant productivity and efficiency improvements since the process of generating disparate live media output streams for numerous consumer devices has been simplified as the generated disparate live media output streams are independent of a requirement to re-process, that is re-encode and re-package, various live media input streams for media distribution to the plurality of consumer devices in real time or near-real time. Thus, the network provider now may provide live channel offerings in cost-effective manner.

Various components, as described above in FIG. 1B, enable the mixed mode publishing system 102 to leverage the modern web streaming protocols, based on which the mixed mode publishing system 102 generates disparate live media output streams of the live broadcast channels around the audience transition points and event overruns, for example. The disparate live media output streams may be generated based on insertion of live input streams into a generated disparate live media output stream using pre-encoded media assets. In this regard, manifests from the live input streams may be manipulated and produced for web distribution along with the pre-encoded media assets.

As the media content itself does not need to be processed beyond the initial creation of the live input streams and pre-encoded media assets prepared for web distribution, it is extremely inexpensive to provide branched networks. It may be based solely on the cost to manipulate the manifests, which provide the instructions for the media players in the client devices 132a, . . . , 132n to execute. The mixed mode publishing system 102 may also support targeted ad insertion on a per client basis through the insertion of ad tags in the generated disparate live media output stream manifest. The mixed mode publishing system 102 may further leverage the processing power of the individual client devices 132a, . . . , 132n to insert targeted channel graphics and overlay advertisements and promotions.

The mixed mode publishing system 102 supports multiple profiles present in the live input streams and pre-encoded media assets into the disparate live media output streams. The mixed mode publishing system 102 further maps live input streams and pre-encoded media assets, having slightly different profile variations, into the disparate live media output streams, based on where or how disparate live media output stream manifests are generated. The mixed mode publishing system 102 further supports multiple DRM tags from the live input stream and pre-encoded media asset manifests. The mixed mode publishing system 102 further maintains accurate program timing for the generated disparate live media output streams. In accordance with an embodiment, the mixed mode publishing system 102 may loop a pre-encoded media asset schedule or portion thereof to keep the disparate live media output stream operational while waiting for a start event from a live input stream that is to be switched into the disparate live media output stream manifest. The mixed mode publishing system 102 may be configured to recover from a failure and not allow restricted content to be delivered to a client device.

As utilized herein the terms “circuits” and “circuitry” refer to physical electronic components (for example, hardware) and any software and/or firmware (“code”) which may configure the hardware, be executed by the hardware, and/or otherwise be associated with the hardware. As used herein, for example, a particular processor and memory may comprise a first “circuit” when executing first one or more lines of code and may comprise a second “circuit” when executing second one or more lines of code. As utilized herein, “and/or” means any one or more of the items in the list joined by “and/or”. As an example, “x and/or y” means any element of the three-element set. As another example, “x, y, and/or z” means any element of the seven-element set. As utilized herein, the term “exemplary” means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing disparate live media output streams in mixed mode.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

The invention claimed is:

1. A computer-implemented method, comprising:

receiving, by one or more processors, a plurality of alternative live media output stream manifests for a live media output stream manifest, wherein an alternative live media output stream manifest of the plurality of alternative live media output stream manifests is derived from the live media output stream manifest by inserting an alternative manifest into an instance of the live media output stream manifest;

selecting, by the one or more processors and from the plurality of alternative live media output stream manifests, the alternative live media output stream manifest based on a programming schedule for a client device; and initiating, by the one or more processors and using the alternative live media output stream manifest, a transition between an input manifest stream corresponding to the live media output stream manifest to an alternative manifest stream corresponding to the alternative live media output stream manifest.

2. The computer-implemented method of claim 1, wherein the alternative live media output stream manifest is selected based at least in part on audience turnover data identifying a likelihood of a viewer switching from the input manifest stream.

3. The computer-implemented method of claim 2, wherein the audience turnover data is based at least in part on a transition point between one or more different audience segments of a set of defined audience segments.

4. The computer-implemented method of claim 1, further comprising:

determining the programming schedule for the client device based at least in part on a geolocation data associated with the client device.

5. The computer-implemented method of claim 4, further comprising:

determining the programming schedule for the client device based at least in part on a comparison between the geolocation data and a rights and preferences database.

6. The computer-implemented method of claim 1, further comprising:

determining the programming schedule for the client device based at least in part on user input indicative of a selection of the alternative manifest stream.

7. The computer-implemented method of claim 1, further comprising:

determining the programming schedule for the client device based at least in part on an audience definition that is indicative of one or more stream owner requirements or user preferences.

8. The computer-implemented method of claim 1, wherein the live media output stream manifest comprises one or more input manifests and an input manifest of the one or more input manifests comprises an input pre-encoded media asset manifest or an input live stream manifest.

9. The computer-implemented method of claim 8, wherein at least one of (a) the input pre-encoded media asset manifest or (b) the input live stream manifest is identified by the programming schedule.

10. The computer-implemented method of claim 8, wherein the alternative live media output stream manifest comprises one or more alternative manifests different from the one or more input manifests.

11. A system comprising one or more processors and at least one memory storing processor-executable instructions that, when executed by the one or more processors, configure the one or more processors to perform operations comprising:

receiving a plurality of alternative live media output stream manifests for a live media output stream manifest, wherein an alternative live media output stream manifest of the plurality of alternative live media output stream manifests is derived from the live media output stream manifest by inserting an alternative manifest into an instance of the live media output stream manifest;

selecting, from the plurality of alternative live media output stream manifests, the alternative live media output stream manifest based on a programming schedule for a client device; and initiating, using the alternative live media output stream manifest, a transition between an input manifest stream corresponding to the live media output stream manifest to an alternative manifest stream corresponding to the alternative live media output stream manifest.

12. The system of claim 11, wherein the alternative live media output stream manifest is selected based at least in part on audience turnover data identifying a likelihood of a viewer switching from the input manifest stream.

13. The system of claim 12, wherein the audience turnover data is based at least in part on a transition point between one or more different audience segments of a set of defined audience segments.

14. The system of claim 11, wherein the operations further comprise:

determining the programming schedule for the client device based at least in part on a geolocation data associated with the client device.

15. The system of claim 14, wherein the operations further comprise:

determining the programming schedule for the client device based at least in part on a comparison between the geolocation data and a rights and preferences database.

16. The system of claim 11, wherein the operations further comprise:

determining the programming schedule for the client device based at least in part on user input indicative of a selection of the alternative manifest stream.

17. One or more non-transitory computer-readable storage media including instructions that, when executed by one or more processors, cause the one or more processors to perform operations comprising:

receiving a plurality of alternative live media output stream manifests for a live media output stream manifest, wherein an alternative live media output stream manifest of the plurality of alternative live media output stream manifests is derived from the live media output stream manifest by inserting an alternative manifest into an instance of the live media output stream manifest;

selecting, from the plurality of alternative live media output stream manifests, the alternative live media output stream manifest based on a programming schedule for a client device; and initiating, using the alternative live media output stream manifest, a transition between an input manifest stream corresponding to the live media output stream manifest to an alternative manifest stream corresponding to the alternative live media output stream manifest.

18. The one or more non-transitory computer-readable storage media of claim 17, wherein the live media output stream manifest comprises one or more input manifests and an input manifest of the one or more input manifests comprises an input pre-encoded media asset manifest or an input live stream manifest.

19. The one or more non-transitory computer-readable storage media of claim 18, wherein at least one of (a) the input pre-encoded media asset manifest or (b) the input live stream manifest is identified by the programming schedule.

20. The one or more non-transitory computer-readable storage media of claim 18, wherein the alternative live media output stream manifest comprises one or more alternative manifests different from the one or more input manifests.

* * * * *